US008702055B2

(12) United States Patent
Alemozafar et al.

(10) Patent No.: US 8,702,055 B2
(45) Date of Patent: Apr. 22, 2014

(54) PORTABLE ELECTRONIC DEVICE HOLDERS

(76) Inventors: Ali Reza Alemozafar, San Francisco, CA (US); Edo Royker, San Francisco, CA (US)

(*) Notice: Subject to any disclaimer, the term of this patent is extended or adjusted under 35 U.S.C. 154(b) by 229 days.

(21) Appl. No.: 13/079,783

(22) Filed: Apr. 4, 2011

(65) Prior Publication Data
US 2011/0240830 A1 Oct. 6, 2011

Related U.S. Application Data

(60) Provisional application No. 61/320,704, filed on Apr. 3, 2010, provisional application No. 61/382,490, filed on Sep. 14, 2010.

(51) Int. Cl.
*A47G 29/00* (2006.01)
(52) U.S. Cl.
USPC .............................. 248/688; 248/689; 248/917
(58) Field of Classification Search
USPC ................... 248/687, 688, 689, 917; D14/447
See application file for complete search history.

(56) References Cited

U.S. PATENT DOCUMENTS

| | | | |
|---|---|---|---|
| 1,161,762 A * | 11/1915 | Bartlett | 248/310 |
| 2,603,134 A | 7/1952 | Burnam | |
| 2,685,757 A | 8/1954 | Mirigian | |
| 3,009,613 A | 11/1961 | Noland | |
| 3,106,037 A | 10/1963 | Harkey | |
| 4,450,993 A | 5/1984 | Ephraim | |
| 4,573,682 A * | 3/1986 | Mayon | 273/148 B |
| 4,799,610 A | 1/1989 | Hsieh | |
| 5,074,222 A | 12/1991 | Welch | |
| 5,222,641 A | 6/1993 | Medeiros, Jr. | |
| 5,421,499 A | 6/1995 | Bauer | |
| 5,573,158 A | 11/1996 | Penn | |
| D388,246 S | 12/1997 | Patterson | |
| D473,563 S * | 4/2003 | Russell | D14/447 |
| 6,616,111 B1 * | 9/2003 | White | 248/309.1 |
| 6,726,070 B2 * | 4/2004 | Lautner | 224/221 |
| 6,749,160 B1 | 6/2004 | Richter | |
| 6,840,487 B2 * | 1/2005 | Carnevali | 248/346.06 |
| 6,938,870 B1 | 9/2005 | Salvador | |
| D564,220 S * | 3/2008 | Dixon | D3/218 |
| 7,850,133 B2 * | 12/2010 | Carnevali | 248/205.5 |
| D640,707 S * | 6/2011 | Yeh | D14/447 |
| D653,668 S * | 2/2012 | Song et al. | D14/447 |
| D658,651 S * | 5/2012 | Lee et al. | D14/452 |
| 8,231,099 B2 * | 7/2012 | Chen | 248/688 |
| D669,890 S * | 10/2012 | Hopkins et al. | D14/251 |
| 2006/0175365 A1 | 8/2006 | Sandler | |
| 2008/0061197 A1 * | 3/2008 | Carnevali | 248/181.1 |
| 2008/0061210 A1 * | 3/2008 | Carnevali | 248/447 |
| 2009/0140113 A1 * | 6/2009 | Carnevali | 248/223.41 |
| 2009/0272779 A1 | 11/2009 | Vu | |
| 2010/0072334 A1 | 3/2010 | Le Gette et al. | |

(Continued)

*Primary Examiner* — Bradley Duckworth

(57) ABSTRACT

In some cases, a portable electronic device holder may include a holding member, a first arm attached to the holding member, a second arm attached to the holding member, a first mounting member attached to the first arm, and a second mounting member attached to the second arm. In other cases, a portable electronic device holder may include a holding member attached to a support member, and one or more mounting member attached to the support member. The one or more mounting members may be for mounting a portable electronic device. The holding member may include a slot and finger grooves for permitting a user to hold the portable electronic device holder.

18 Claims, 34 Drawing Sheets

(56) References Cited

U.S. PATENT DOCUMENTS

| | | | |
|---|---|---|---|
| 2010/0171021 A1* | 7/2010 | Smith | 248/558 |
| 2011/0031287 A1 | 2/2011 | Le Gette et al. | |
| 2011/0095159 A1* | 4/2011 | Carnevali | 248/372.1 |
| 2011/0279959 A1* | 11/2011 | Lopez | 361/679.03 |
| 2012/0025684 A1* | 2/2012 | Trotsky | 312/334.1 |
| 2012/0061542 A1* | 3/2012 | Bostater | 248/278.1 |
| 2012/0097831 A1* | 4/2012 | Olukotun et al. | 248/688 |
| 2012/0104185 A1* | 5/2012 | Carroll | 248/27.1 |
| 2012/0118770 A1* | 5/2012 | Valls et al. | 206/320 |
| 2012/0317776 A1* | 12/2012 | Carnevali | 29/428 |
| 2013/0140837 A1 | 6/2013 | Carroll | |

* cited by examiner

PORTABLE ELECTRONIC DEVICE HOLDERS

CROSS-REFERENCE

This application claims priority to U.S. Provisional Patent Application Ser. Nos. 61/320,704 ("PORTABLE ELECTRONIC DEVICE HOLDERS"), filed on Apr. 3, 2010, and 61/382,490 ("PORTABLE ELECTRONIC DEVICE HOLDERS"), filed on Sep. 14, 2010, which are entirely incorporated herein by reference.

BACKGROUND OF THE INVENTION

A portable computer is a personal computer that may be moved from one place to another. A portable computer may include a display, keyboard and mouse.

A laptop is a personal computer designed for mobile use and small and sufficiently light to sit on a user's lap while in use. A laptop integrates most of the typical components of a desktop computer, including a display, a keyboard, a pointing device (a touchpad, also known as a trackpad, and/or a pointing stick), speakers, and often including a battery, into a single small and light unit. The rechargeable battery (if present) is charged from an AC adapter and typically stores enough energy to run the laptop for two to three hours in its initial state, depending on the configuration and power management of the computer.

Laptop personal computers ("Laptops") are a ubiquitous part of society and may be used in virtually all aspects of daily life. Laptops provide the power of desktop personal computers and the ease of mobility. Laptops permit users to have ready computing power at various locations, such as at users' desks or during travel. Use of laptops while standing or moving around has been limited to balancing on one forearm, and typing single handedly with the free arm. Work-around devices have been made, most notably the tablet personal computer ("PC"). Personal computer holders may enable users to use their PCs while standing or moving around.

SUMMARY OF THE INVENTION

In an aspect of the invention, a portable electronic device holder comprises a holding member configured to permit a user to hold the portable personal computer holder; one or more arms attached to the holding member; and one or more mounting members attached to each of the one or more arms, wherein each of the one or more mounting members mounting members is configured to mount a portable electronic device.

In another aspect of the invention, a portable personal computer holder comprises a holding member configured to permit a user to hold the portable personal computer holder; a first arm attached to the holding member; a first mounting member attached to the first arm, the first mounting member configured to mount a portable personal computer; a second arm attached to the holding member; and a second mounting member attached to the second arm, the second mounting member configured to mount a portable personal computer.

In yet another aspect of the invention, a portable electronic device holder comprises a support member having a front side and a back side, the back side configured to be adjacent a portable electronic device when the portable electronic device has been mounted by the portable electronic device holder; a holding member disposed atop the front side of the support member, the holding member configured to permit a user to hold the portable electronic device holder; and one or more mounting members attached to the support member, wherein each of the one or more mounting members are configured to mount a portable electronic device. In some embodiments, the one or more mounting members are for holding a portable electronic device against the back side of the support member.

In still another aspect of the invention, a portable personal computer holder comprises a support member having a front side and a back side, wherein the back side is configured to be adjacent a portable personal computer when the portable personal computer holder has mounted the portable personal computer; a holding member disposed atop the front side of the support member, the holding member configured to permit a user to hold the portable personal computer holder; a first mounting member disposed at a first side or corner of the support member, the first mounting member configured to mount a portable personal computer; and a second mounting member disposed at a second side or corner of the support member, the second mounting member configured to mount a portable personal computer.

In still another aspect of the invention, a portable personal computer holder comprises a support member having a front side and a back side, the back side configured to be adjacent a portable personal computer when the portable personal computer holder has mounted the portable personal computer; a holding member disposed atop the front side of the support member, the holding member configured to attach the portable personal computer holder to a user's wrist, arm or forearm; a first mounting member disposed at a first side or corner of the support member, the first mounting member configured to mount a portable personal computer; and a second mounting member disposed at a second side or corner of the support member, the second mounting member configured to mount a portable personal computer.

In still another aspect of the invention, a portable electronic device holder comprises a holding member configured to permit a user to hold the portable electronic device holder; one or more mounting members for mounting a portable electronic device; and one or more support members and one or more arms for attaching the holding member to the one or more mounting members.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1A:
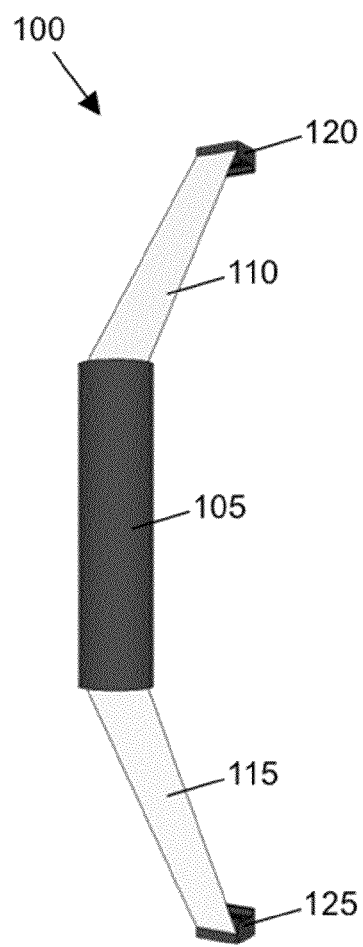
FIG. 1A is a schematic perspective side view of a portable electronic device holder (also "PEDH" herein), in accordance with an embodiment of the invention.

While preferable embodiments of the invention have been shown and described herein, it will be obvious to those skilled in the art that such embodiments are provided by way of example only. Numerous variations, changes and substitutions will now occur to those skilled in the art without departing from the invention. It should be understood that various alternatives to the embodiments of the invention described herein may be employed in practicing the invention.

In embodiments of the invention, portable electronic device holders (also "holders" and "portable electronic holders" herein) are provided. Portable electronic devices holders of embodiments of the invention are configured to permit a user to hold or grip a portable electronic device, such as a slate, tablet, or slate tablet personal computer. Portable electronic device holders of embodiments of the invention may permit use of a portable personal electronic device (also "portable electronic device" herein), such as a portable computer or tablet personal computer, when the user is moving from one point to another, or when the user is seated in an airplane, a passenger automobile (also "car" herein), or a passenger bus (also "bus" herein).

Portable electronic device holders and grips of embodiments of the invention are based on the realization that there are limitations associated with current portable electronic device holders. For example, at least some current computer holders may not permit a user to use a portable computer in a confined space, such as when the user is seated in an airplane, the passenger seat of an automobile (also "car" herein), or a passenger bus (also "bus" herein). As another example, at least some current computer holders do not permit a user to firmly grip or hold a portable electronic device or computer.

In addition, such devices may not permit a user to readily and securely mount the device to a portable personal computer and dismount the device from portable personal computer. Further, such devices may not enable a user to make effective use of the portable personal computer while moving from one location to another.

As portable personal computers become thinner, holding or gripping such devices may become more difficult. The slippery surfaces of some current portable personal computers add to the difficulty in holding or gripping current portable personal computers. While a user may hold or grip a tablet PC using the sides of the tablet PC (e.g., Apple iPad®), the user may find it difficult to use the tablet PC while the user is standing (e.g., to give a presentation) or walking from one location to another. For example, current tablet PCs provide a user with features that may obviate the need for a keyboard and mouse, such as an on-screen keyboard and a capacitive or resistive touch screen, which enables the user to access various content with the user's one or more fingers. However, in some cases, such as when the user is standing, walking or running from one location to another, the user may find it difficult to use the on-screen keyboard or capacitive touch screen if the user is holding the tablet PC with one or more of the user's hand.

Portable electronic device grips and holders of embodiments of the invention are based at least in part on the finding that a portable electronic device grip or holder configured to enable a user to hold (or grip) a portable electronic device, such as a portable personal computer, may improve the user's productivity, such as by enabling the user to readily and securely mount the device to a portable electronic device and use the portable electronic device while standing, walking or running.

Portable electronic device holders of embodiments of the invention advantageously permit a user to grip or hold a portable electronic device (also "device" herein), such as a tablet PC (also "tablet" herein). In addition, portable electronic device grips and holders of embodiments of the invention permit a user to readily and securely grip (or hold) a portable personal computer while standing, walking, or running from one location to another.

Portable electronic device holders of embodiments of the invention may permit a user to use an electronic device, such as a tablet PC, in various settings. For example, holders of embodiments of the invention may permit a user to operate a portable electronic device, such as a PC, tablet PC or Smartphone, while seated in a confined space, such as in an office, an airplane, the passenger seat of an automobile, or a passenger bus, where the user's available space, such as the space defined by the distance between seats (e.g., the user's seat and the seat in a row in front of the user), may make use of the portable electronic device difficult. For example, portable electronic device holders of embodiments of the invention may permit a user to use a tablet PC in an airplane. As another example, holders of embodiments of the invention may permit a user to use a tablet PC while standing. As yet another example, holders of embodiments of the invention may permit a user to use a tablet PC while the user is walking (even running) from one location to another.

Portable electronic device holders of embodiments of the invention may be configured for use with various portable electronic devices. In an embodiment, portable electronic device holders are configured for use with a tablet PC (also "tablet" herein), such as an Apple iPad, HP Slate, Lenovo tablets, Fusion Garage JooJoo, Dell Mini tablets and Android tablets. In another embodiment, portable electronic holders are configured for use with a phone or Smartphone, such as, e.g., an Apple iPhone or an Android enabled phone.

Portable Electronic Device Holders

In an aspect of the invention, a portable personal computer holder (also "holder" herein) is provided, comprising a holding member configured to permit a user to hold the portable personal computer holder. In an embodiment, the user holds the portable personal computer holder by gripping the holding member. The holder further comprises a first arm attached to the holding member and a first mounting member attached to the first arm, the first mounting member configured to mount a portable personal computer. The holder further comprises a second arm attached to the holding member and a second mounting member attached to the second arm, the second mounting member configured to mount a portable personal computer.

Reference will now be made to the figures, wherein like numerals refer to like parts throughout. It will be appreciated that the figures are not necessarily drawn to scale.

FIGS. 1A-1I show a portable electronic device holder (PEDH), in accordance with various embodiments of the invention. The PEDH of FIGS. 1A-1F may be configured for use with portable personal computers, such as tablet PCs.

With reference to FIGS. 1A-1E, a PEDH 100 is shown, in accordance with various embodiments of the invention. The PEDH 100 comprises a holding member (also "handle" herein) 105, and a first arm 110 and a second arm 115 attached to the holding member 105. The PEDH 100 further comprises a first mounting member 120 attached to the first arm 110, and a second mounting member 125 attached to the second arm 115.

With reference to FIG. 1A, the holding member 105 may be configured to permit a user to hold the PEDH 100. In an embodiment, the holding member 105 is cylindrical in shape. In other embodiments, the holding member 105 may have various geometric shapes, such as circular, ring or donut-shaped, triangular, or box-like. The holding member may include one or more grooves or depressions for a user's fingers. The grooves or depressions may enhance the contact between the user's fingers and the holding member, thereby improving the manner in which the user holds the holding member 105.

In an embodiment, the holding member 105 may be formed of a polymeric material. In another embodiment, the holding member 105 may be formed of a soft material, such as a material having padding that may provide comfort to a user's hand when in use. In an embodiment, the holding member 105 may include an outer layer circumscribing a layer of soft or pliable material, such as foam or padding. The outer layer may be formed of material of various shapes, designs and/or colors. In an embodiment, the outer layer may be customizable by a user, as desired.

Figure 1B:
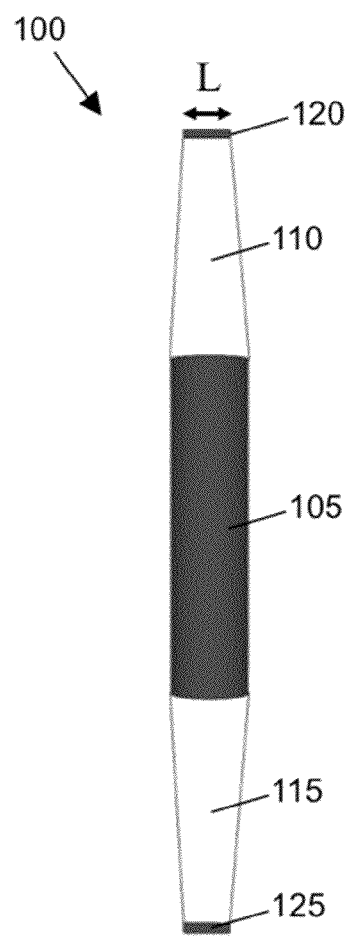
FIG. 1B is a schematic perspective view of the holder, in accordance with an embodiment of the invention.

With reference to FIG. 1B, the first arm 110 and the second arm 115 extend away from the holding member 105 and attach to the first mounting member 120 and second mounting member 125, respectively. Each of the first mounting member 120 and second mounting member 125 is configured to mount a portable electronic device, such as, e.g., a tablet PC or slate.

Figure 1C:
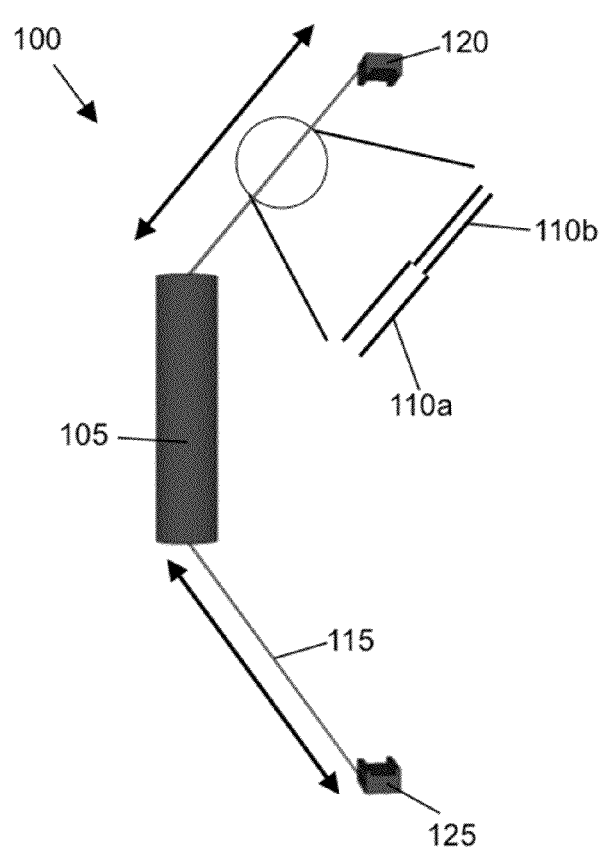
FIG. 1C is a schematic perspective side view of the holder, showing a blow-up of a first arm of the holder, in accordance with an embodiment of the invention. The arms of the holder may have adjustable lengths, as indicated by the two-way arrows.

With reference to FIG. 1C, a perspective side view of the PEDH 100 is shown, in accordance with an embodiment of the invention. One or both of the first arm 110 and the second arm 115 may have a length that is adjustable, as indicated by the two-way arrows. In an embodiment, adjustability in length may permit a user to mount the PEDH 100 on portable electronic devices of various sizes.

In an embodiment, adjustability in length may be achieved by having an arm formed of two pieces, a first piece and a second piece. The first piece may at least partially circumscribe the second piece. The second piece may be configured to move (or slide) along an axis parallel to the first piece. In another embodiment, adjustability in length for one or more of the arms may be achieved by having an arm formed of a flexible material, such as a polymeric material (e.g., homopolymer or copolymer). In an embodiment, the polymeric material has a glass transition temperature (Tg) that is between about 10° C. and 80° C., or between about 25° C. and 60° C.

In various embodiments, one or more of the arms 110 and 115 of the PEDH 100 may be flexible. In an embodiment, one or more of the arms 110 and 115 of the PEDH 100 may be extendable from the holding member 105 and retractable to the holding member 105. In an embodiment, one or more of the arms 110 and 115 of the PEDH 100 may include an elastic material that is configured to permit the one or more arms to extend away from the holding member 105 and retract to the holding member 105. In such a case, a user may mount the PEDH 100 on a portable electronic device by extending or stretching one or more of the arms 110 and 115 and attaching the mounting members 120 and 125 to the sides or edges of the portable electronic device. In an embodiment, once the mounting members 120 and 125 are removed from the portable electronic device, they retract to their original lengths.

With reference to FIG. 1C, in an embodiment, the length of the first arm 110 may be adjustable by having a first piece 110a and a second piece 110b, the first piece 110a having a width that is larger than a width of the second piece 110b. The first piece 110a, as illustrated, is configured to at least partially circumscribe the second piece 110b. The first piece 110a is attached to the holding member 105 and the second piece 110b is attached to the first mounting member 120. The second piece 110b is configured to slide (or move) along an axis parallel to the first piece 110a. A locking mechanism (not shown) may hold (or lock) the second 110b piece against the first piece 110a when a desirable (or predetermined) length for the first arm 110 has been achieved.

Figure 1D:
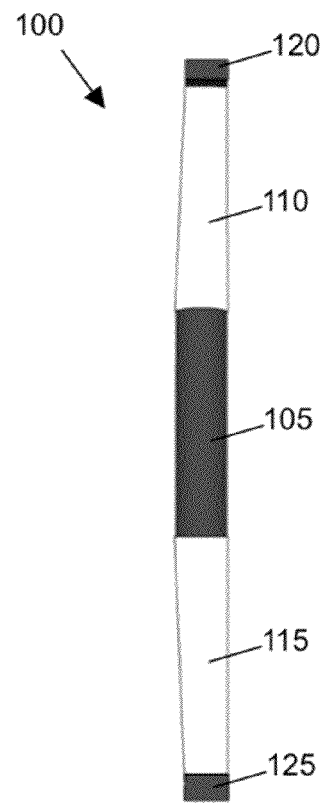
FIG. 1D is a schematic perspective back view of the holder, in accordance with an embodiment of the invention.

With reference to FIG. 1D, a front view of the PEDH 100 is shown, in accordance with an embodiment of the invention. The first mounting member 120 and the second mounting member 125 may be configured to come in contact with one or more surfaces of a portable electronic device. For example, if the PEDH 100 is used with a portable personal computer, the first mounting member 120 and the second mounting member 125 may be configured to come in contact with a front surface of the portable personal computer. As yet another example, the mounting members 120 and 125 may be configured to come in contact with the corners of a portable electronic device (see below).

Figure 1E:
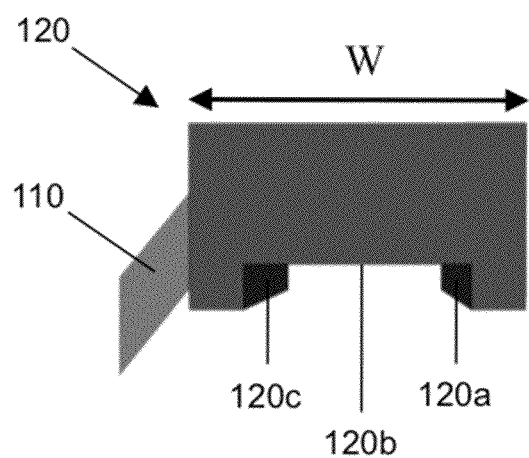
FIG. 1E is a schematic perspective side view of a mounting member, in accordance with an embodiment of the invention.
Figure 1E:
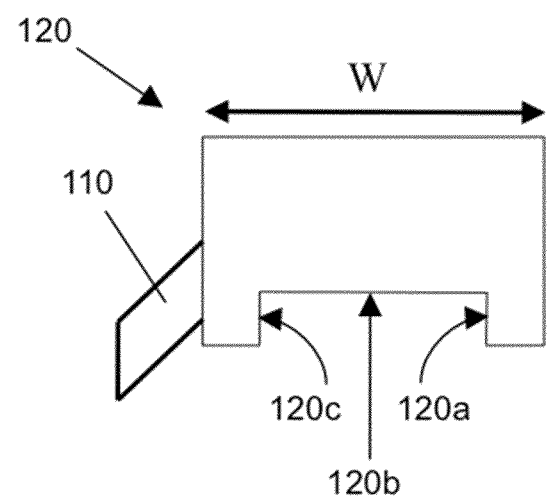

With reference to FIG. 1E, blow-ups (schematic perspective side view, top, and schematic cross-sectional side view, bottom) of the first mounting member 120 are shown, in accordance with an embodiment of the invention. The first mounting member 120 comprises a first surface 120a configured to come in contact with a front side of a portable electronic device, a second surface 120b configured to come in contact with a top side of the portable electronic device, and a third surface 120c configured to come in contact with a back side of the portable electronic device. The first surface 120a and third surface 120c may have any length (as measured along an axis orthogonal to a top surface of the first mounting member 120). In an embodiment, the length of one or both of the first surface 120a and third surface 120c is between about 0.1 inches and 3 inches, or between about 0.4 inches and 1.5 inches. In an embodiment, the second surface 120b has a length (as measured along an axis parallel to the axis marked by 'W') between about 0.1 inches and 3 inches, or between about 0.25 inches and 1.5 inches. In an embodiment, the length of the second surface 120b is between about 0.5 inches and 1 inch.

In an embodiment, one or more of the surfaces 120a, 120b, and 120c may include a padding member for providing padding to a surface of the portable electronic device 130 (or any other portable electronic device). In an embodiment, the padding member may include cushioning to the portable electronic device 130 when the mounting member 120 has mounted the portable electronic device 130. In another embodiment, the padding member may prevent scratching of the portable electronic device 130 once the mounting member 120 has mounted the portable electronic device 130. In another embodiment, the padding member may be configured to capture static electricity (or charge) from the holder 100 or the portable electronic device 130.

In an embodiment, the mounting members 120 and 125 may be formed of a metallic material, such as aluminum. In such a case, the mounting members may be sized for portable electronic devices of various thicknesses. In other embodiments, the mounting members 120 and 125 may be formed of a polymeric material. In an embodiment, the mounting members 120 and 125 are formed of a heat-treatable polymeric material, such as a thermoplastic. This may permit a user to mold the mounting members 120 and 125 to have widths that conform to the thickness of a portable electronic device. In another embodiment, the mounting members 120 and 125 are formed of an elastomer or elastomeric thermoset (e.g., rubber).

In an alternative embodiment, the mounting members may be configured to mount (or attach to) or mate with a structure attached to a portable electronic device. For example, if the portable electronic device includes attachment holes or grooves (e.g., holes or grooves at a top surface and bottom surface of the portable electronic device), the mounting members may be hooks configured to mate with the holes or grooves. In another embodiment, the mounting members may be formed of a magnetic field-inducing material configured to produce a magnetic field. In such a case, the portable electronic device may include a material that is configured to be attracted toward the magnetic field-inducing material when the mounting members are in close proximity to such material. In yet another embodiment, the mounting members are formed of a material that is configured to be attracted toward a magnetic field, and the portable electronic device includes a material that is configured to induce (or produce) a magnetic field. In still another embodiment, the mounting members are detachable from the PEDH 100. In such a case, the user may attach the mounting members to a probable electronic device and attach the PEDH 100 to the mounting members when the user desires to mount the PEDH 100 to the portable electronic device.

With reference to FIGS. 1F-1I, the PEDH 100 is configured to mount a portable electronic device 130, in accordance with embodiments of the invention. The portable electronic device 130 of FIGS. 1F-1I is a portable personal computer, such as a tablet PC (e.g., Apple iPad®). It will be appreciated that the PEDH 100 may be used with other portable electronic devices, such as smart phones and electronic books (e.g., Amazon® Kindle).

Figure 1F:
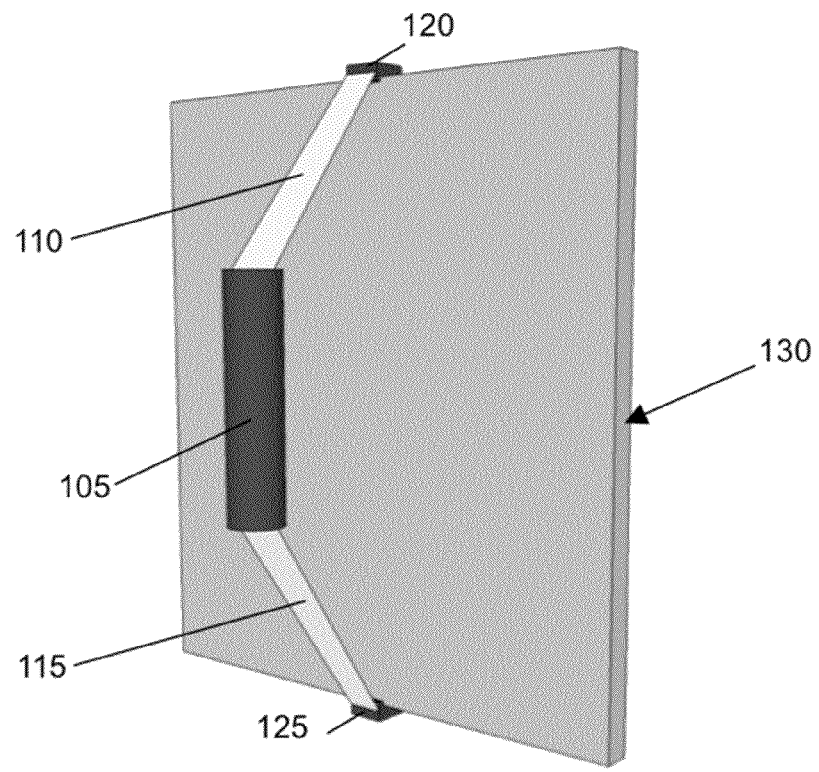
FIGS. 1F-1I schematically illustrate the holder mounting a portable electronic device, in accordance with an embodiment of the invention.
Figure 1G:
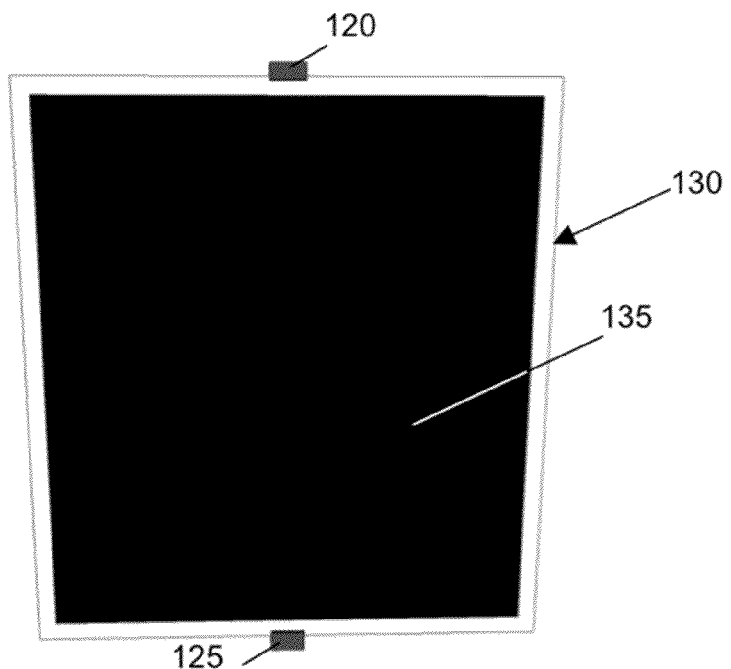

With reference to FIGS. 1F and 1G, the PEDH 100 is mounted on the portable electronic device 130. With the first mounting member 120 and second mounting member 125 mounted on the portable electronic device 130, a user may hold the holding member and use the portable electronic device. With reference to FIG. 1G, the mounting members 120 and 125 are configured to secure the PEDH 100 to the portable electronic device 130 without blocking or obscuring a screen 135 of the portable electronic device 130.

Figure 1H:
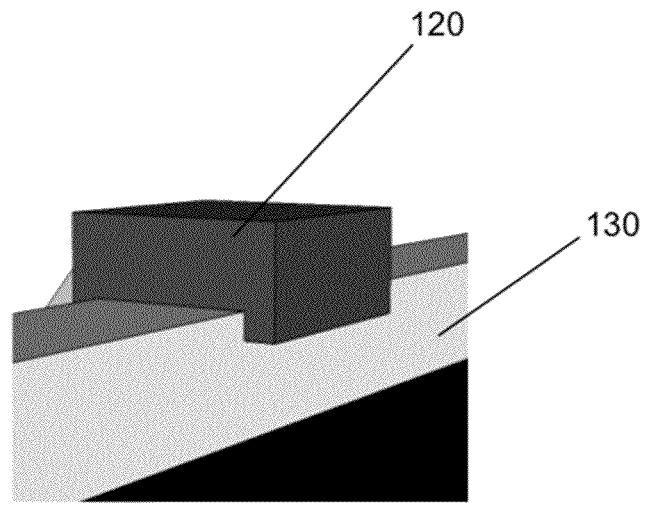
Figure 1I:
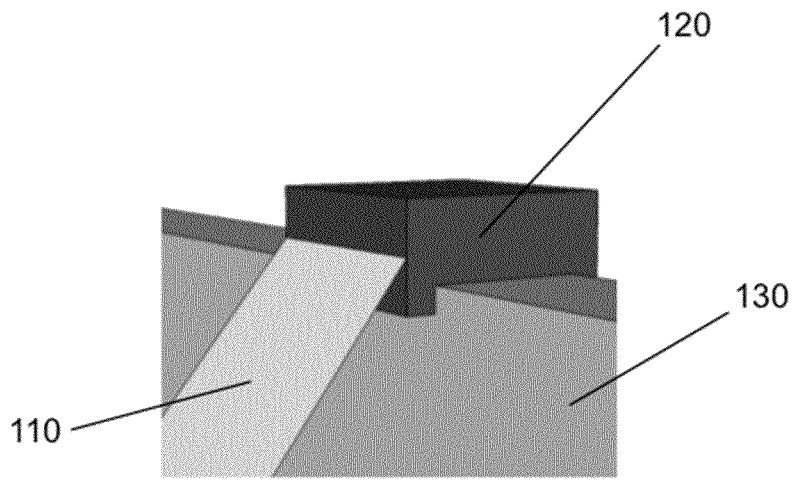

With reference to FIGS. 1H and 1I, a blow-up of the first mounting member 120 secured against the portable electronic device 130 is shown, in accordance with an embodiment of the invention. The first, second and third surfaces of the first mounting member 120 (see FIG. 1E) are in contact with the portable electronic device 130.

In an embodiment, the holding member 105 may be configured to permit a user to grip the circumference of the holding member 105 with the user's fingers. In another embodiment, the holding member may include a support member having one or more slots for a user's fingers (see, e.g., FIGS. 8A-8I and the accompanying text). In such a case, the user may inserts the user's fingers into a slot to engage the holder 100. In an embodiment, the one or more slots may have a circular, triangular, square, rectangular, pentagonal, or hexagonal cross-section. In another embodiment, the holding member 105 may include a support member having a slot and holes for a user's fingers (see, e.g., FIGS. 8A-8I and the accompanying text). In such a case, the arms 110 and 115 may be attached to the support member.

In various embodiments, the portable electronic device holder ("holder") may include one or more rotating members to permit a user to adjust the angles of one or more arms and mounting members of the holder.

Figure 2A:
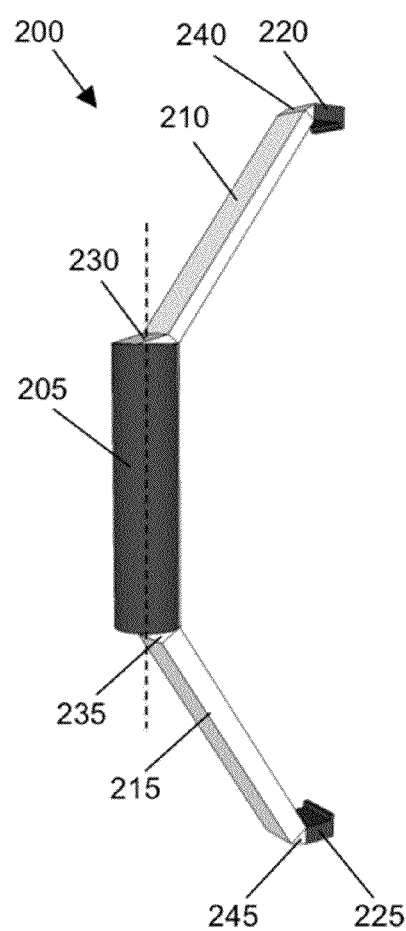
FIGS. 2A and 2B are schematic perspective side views of a portable electronic device holder, in accordance with an embodiment of the invention. The dotted line in FIG. 2A designates an axis of symmetry of a holding member of the holder of FIG. 2A.
Figure 2B:
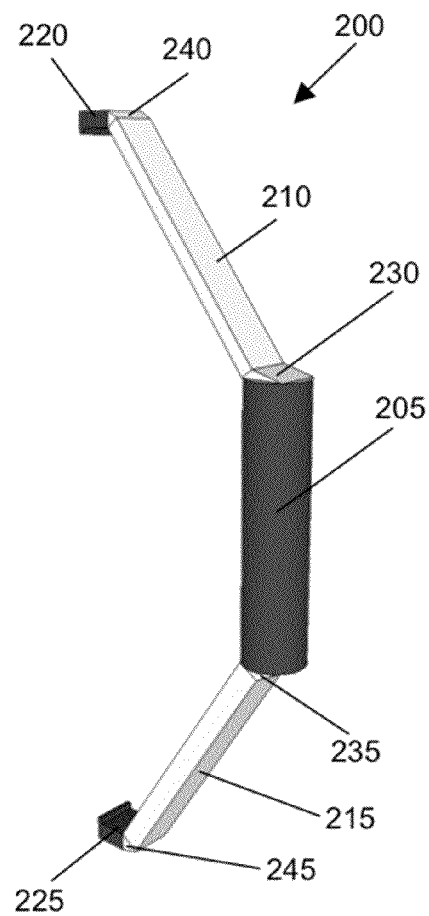

With reference to FIGS. 2A and 2B, a holder 200 is shown, in accordance with an embodiment of the invention. The holder 200 includes a holding member 205, a first arm 210, a second arm 215, a first mounting member 220 and a second mounting member 225. The first arm 210 is attached to the holding member 205 through a first rotating member 230. The second arm 215 is attached to the holding member 205 through a second rotating member 235. The first mounting member 220 is attached to the first arm 210 through a third rotating member 240. The second mounting member 225 is attached to the second arm 215 through a fourth rotating member 245. The rotating members may be selected from locking click wheels, turn wheels with locking mechanisms, pivot joints, and pivot members. In an embodiment, one or both of the first arm 210 and the second arm 215 may have lengths that are adjustable.

With continued reference to FIGS. 2A and 2B, the first and second rotating members 230 and 235 are configured to permit the user to adjust the angle between each of the first and second arms 210 and 215, respectively, and a plane parallel to the holding member 205. The third and fourth rotating members 240 and 245 are configured to permit the user to adjust the angle between each of the first and second mounting members 220 and 225, respectively, and a plane parallel to each of the first arm 210 and the second arm 215. That is, the third rotating member 240 may permit the user to rotate the first mounting member 220 in relation to the first arm 210, and the fourth rotating member 245 may permit the user to rotate the second mounting member 225 in relation to the second arm 215.

The mounting members 220 and 225, as illustrated, are hook-type mounting members configured to mate with structures attached to (or part of) a portable electronic device. In an alternative embodiment, the mounting members 220 and 225 may be as described above in the context of FIGS. 1A-1I. For example, the mounting members 220 and 225 may each have a first surface for coming in contact with a front side of a portable electronic device, a second surface for coming in contact with a top (or bottom) surface of the portable electronic device, and a third surface for coming in contact with a back surface of the portable electronic device.

In embodiments, portable electronic device holders may include two or more arms. In embodiments, portable electronic device holders may include 1 or more arms, or 2 or more arms, or 3 or more arms, or 4 or more arms, or 5 or more arms, or 10 or more arms, or 15 or more arms, or 20 or more arms. In certain embodiments, portable electronic device holders may include 2 arms, or 3 arms, or 4 arms, or 5 arms, or 6 arms, or 7 arms, or 8 arms, or 9 arms, or 10 arms.

In embodiments, the mounting members may be positioned so as to provide secure attachment of the portable electronic device holder to the portable electronic device. In embodiments, mounting members may be attached to one or more of the sides, corners, edges, front sides and back sides of the portable electronic device.

In embodiments, an arm is attached to 1 or more mounting members, or 2 or more mounting members, or 3 or more mounting members, or 4 or more mounting members, or 5 or more mounting members, or 10 or more mounting members. In an embodiment, an arm is attached to one mounting member. In another embodiment, an arm is attached to two mounting members disposed adjacent one another.

In embodiments, mounting members may have lengths—i.e., the distance between opposing edges or sides of a mounting member as measured along an axis parallel to a portable electronic device (see FIG. 1B, 'L')—greater than or equal to about 0.1 inches, or greater than or equal to about 0.5 inches, or greater than or equal to about 1 inch, or greater than or equal to about 2 inches, or greater than or equal to about 3 inches, or greater than or equal to about 4 inches, or greater than or equal to about 5 inches, or greater than or equal to about 6 inches, or greater than or equal to about 7 inches, or greater than or equal to about 8 inches, or greater than or equal to about 9 inches, or greater than or equal to about 10 inches. In embodiments, mounting members may have widths—i.e., the distance between opposing edges or sides of a mounting member as measured along an axis orthogonal to a back side or front side of a portable electronic device (see FIG. 1E, 'W')—greater than or equal to about 0.1 inches, or greater than or equal to about 0.2 inches, or greater than or equal to about 0.3 inches, or greater than or equal to about 0.4 inches, or greater than or equal to about 0.5 inches, or greater than or equal to about 1 inch, or greater than or equal to about 2 inches, or greater than or equal to about 3 inches, or greater than or equal to about 4 inches, or greater than or equal to about 5 inches, or greater than or equal to about 6 inches.

In embodiments, mounting members may be secured at locations of the portable electronic device so as to enable a user to move the portable electronic device with the aid of the portable electronic device holder without the portable electronic device slipping along or out of, or falling out of, the portable electronic device holder. In an embodiment, mounting members are configured for placement at top and bottom edges of the portable electronic device, thereby permitting the user to pick up the portable electronic device (with the aid of the portable electronic device holder) and twist and turn the portable electronic device, as desired. In another embodiment, mounting members are configured for placement at the corners of the portable electronic device. In yet another embodiment, mounting members are configured for placement at the edges and corners of the portable electronic device.

With reference to FIGS. 3A-3E, a portable electronic device holder ("PEDH") 300 having four arms is shown, in accordance with an embodiment of the invention. The PEDH 300 includes a holding member 305. The PEDH 300 further includes a first arm 310, second arm 315, third arm 320 and fourth arm 325. A first mounting member 330 is attached to the first arm 310; a second mounting member 335 is attached to the second arm 315; a third mounting member 340 is attached to the third arm 320; and a fourth mounting member 345 is attached to the fourth arm 325.

Figure 3A:
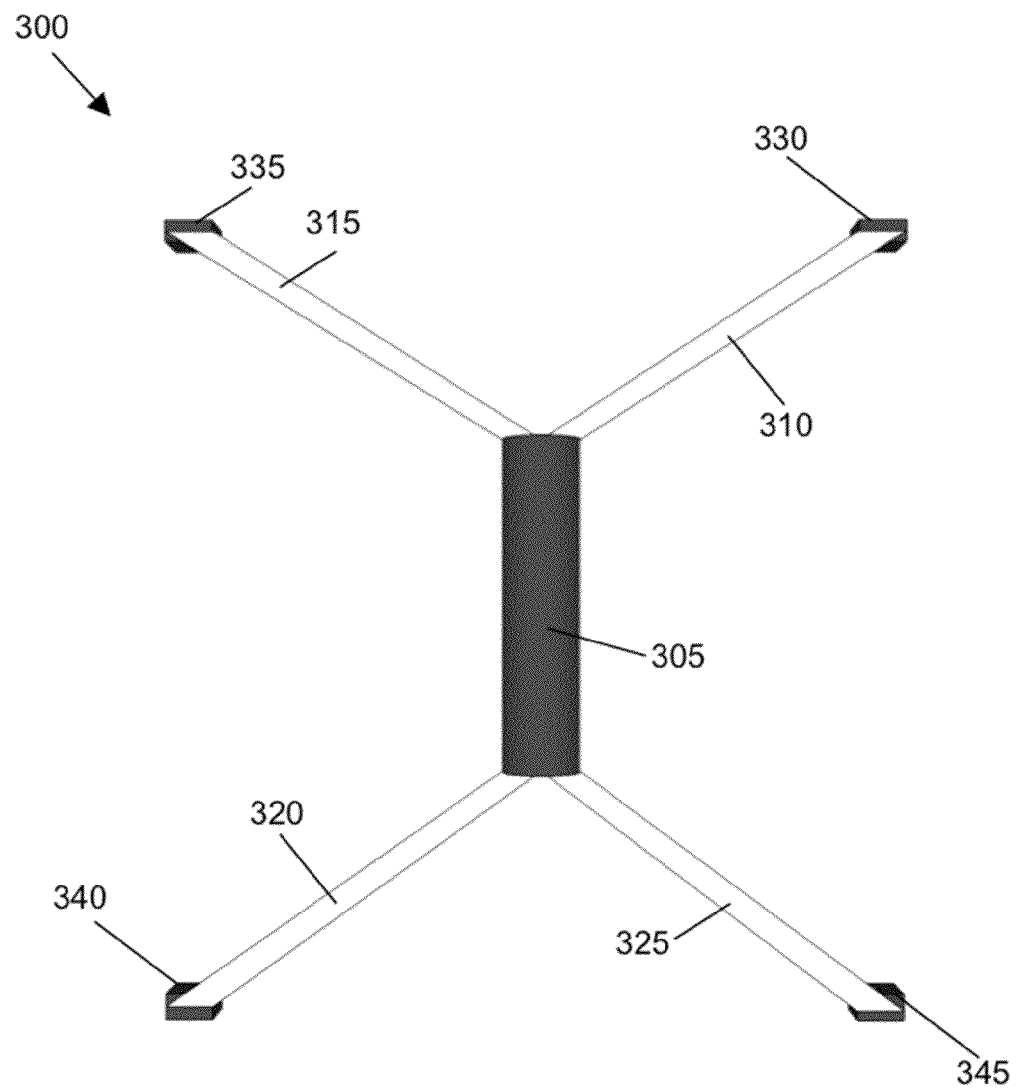
FIGS. 3A-3C schematically illustrate a portable electronic device holder, in accordance with an embodiment of the invention.
Figure 3B:
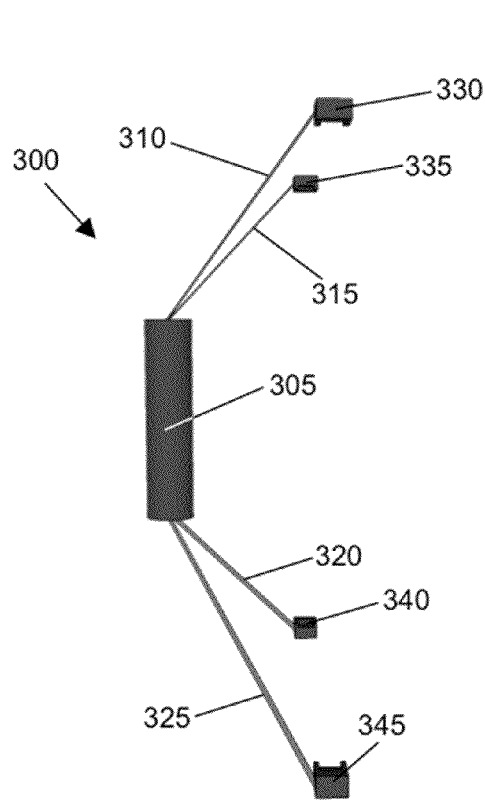

With reference to FIGS. 3A-3B, in various embodiments, one or more of the arms 310, 315, 320 and 325 may include rotating members. In an embodiment, the rotating members may enable each of the arms 310, 315, 320 and 325 to rotate in relation to a plane (or axis) having the holding member 305, such as, e.g., a plane parallel to a long axis of the holding member 305. In another embodiment, the rotating members may enable each of the mounting members 330, 335, 340, and 345 to rotate in relation to a plane (or axis) having each of the arms 310, 315, 320 and 325, such as, e.g., planes parallel to long axes of each of the arms 310, 315, 320 and 325. Rotating members may advantageously permit a user to configure the holder 300 for desired use, such as, for example, to adjust the angle between the user's eyes and the portable electronic device, or to adjust the manner in which the user holds or grips the holding member 305. For example, the first arm 310 and second arm 315 may include rotating members disposed between each of the first arm 310 and the second arm 315 and the holding member 305, the rotating members configured to permit the arms to rotate in relation to a plane having the holding member 305 (see FIGS. 2A and 2B).

Figure 3C:
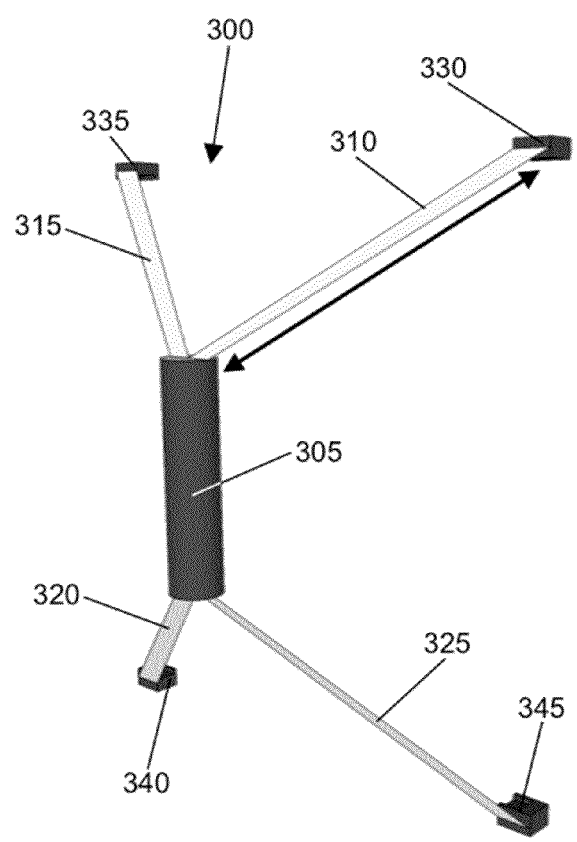
Figure 3D:
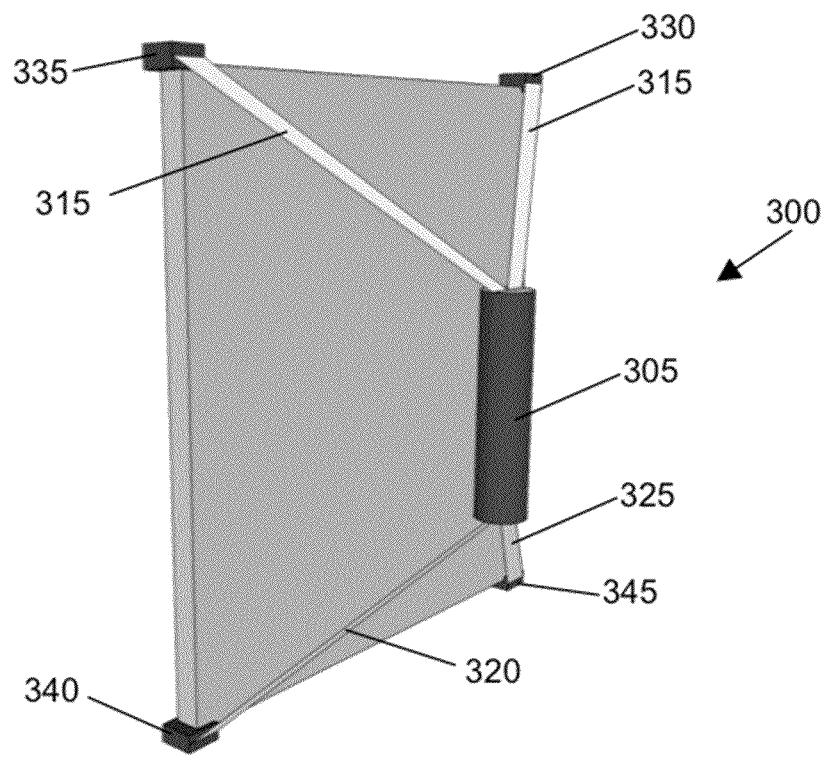
FIGS. 3D and 3E schematically illustrate the PEDh of FIGS. 3A-3C mounted on a portable electronic device, in accordance with an embodiment of the invention.
Figure 3E:
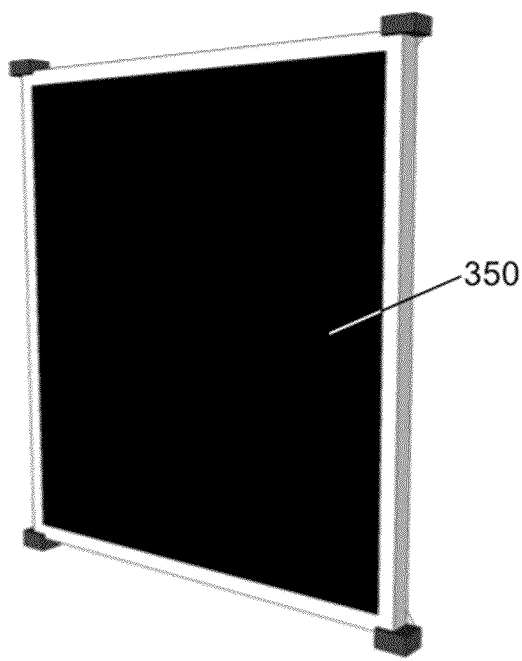

With reference to FIG. 3D, the holder 300 may be mounted on a portable electronic device 350, such as a tablet PC. Each of the mounting members 330, 335, 340 and 345 is configured to come in contact with an edge (or edge portion) of a portable electronic device 350 when the holder 300 has mounted the portable electronic device 350. In an embodiment, each of the mounting members 330, 335, 340 and 345 includes a first surface for coming in contact with a front side of the portable electronic device 350, a second surface for coming in contact with a top or bottom side of the portable electronic device 350, and a third surface for coming in contact with a back side of the portable electronic device 350.

With reference to FIG. 3B, the mounting members 330, 335, 340, and 345 may be configured to mount the portable electronic device 350 at edge portions of the portable electronic device 350. In other embodiments, the mounting members 330, 335, 340, and 345 may be configured to come in contact with other portions of the portable electronic device 350, such as, e.g., the top, bottom and side portions. In an embodiment, the mounting members 330, 335, 340, and 345 may be formed of a polymeric material. In still other embodiments, the mounting members may be selected from hooks, clamps, fasteners, magnetic field-inducing materials, and material attractable in a magnetic field (see above).

With reference to FIGS. 3A-3C, the mounting members 330, 335, 340 and 345 may be detachable from the arms 310, 315, 320 and 325, respectively. In embodiments, the mounting members 330, 335, 340 and 345 may be attachable to and detachable from the arms 310, 315, 320 and 325, respectively.

With reference to FIG. 3C, one or more of the first arm 310, second arm 315, third arm 320 and fourth arm 325 may have adjustable lengths. In the illustrated embodiment, the first arm 310 has an adjustable length. It will be appreciated, however, that one or more of the second, third and fourth arms 315, 320 and 325, respectively, may have adjustable lengths.

Portable Electronic Device Holders Having Support Members

In another aspect of the invention, a portable electronic device holder (also "PEDH" and "holder" herein) is provided, comprising a support member having a front side (or surface) and a back side (or surface), wherein the back side is configured to be adjacent a portable electronic device (e.g., portable personal computer) when the portable electronic device holder has mounted the portable electronic device. In an embodiment, the support member is configured to come in contact with a back side of a portable electronic device when the holder has mounted the portable electronic device. The holder further comprises a holding member disposed atop the front side of the support member, the holding member configured to permit a user to hold the portable electronic device holder. A first mounting member is disposed at a first side or corner of the support member, the first mounting member configured to mount a portable electronic device. A second mounting member is disposed at a second side or corner of the support member, the second mounting member configured to mount a portable electronic device. In an embodiment, the portable electronic device holder is configured for use with a portable personal computer (e.g., tablet PC). In an embodiment, the holder may further include a third mounting member disposed at a third side or corner of the support member. In an embodiment, the holder may further include a fourth mounting member disposed at a fourth side or corner of the support member.

In embodiments, the holder may include 1 or more, or 2 or more, or 3 or more, or 4 or more, or 5 or more, or 6 or more, or 7 or more, or 8 or more, or 9 or more, or 10 or more support members. In an embodiment, the holder includes a single support member. In another embodiment, the holder includes two support members that may be disposed in a side-by-side configuration.

In embodiments, the holder may include 1 or more, or 2 or more, or 3 or more, or 4 or more, or 5 or more, or 6 or more, or 7 or more, or 8 or more, or 9 or more, or 10 or more holding members (also "handles" herein). In an embodiment, the holder may include a single handle. In another embodiment, the holder may include two handles.

In embodiments, the holder includes one or more support members that may have cross-sectional shapes that are circular, triangular, square, rectangular, pentagonal, hexagonal, heptagonal, or octagonal, or a combination of shapes. For example, the holder may include a single rectangular support member. As another example, the holder may include two square support members that are disposed adjacent one another. As yet another example, the holder may include a support member having a shape that is a combination of circular and square shapes. As still another example, the holder may include a single support member with a box-like central portion and circular side portions.

In an embodiment, the support member may include one or more padding members at the back side of the support member, the padding members configured to come in contact with a portable electronic device. The padding members may provide padding for the portable electronic device once the holder has mounted the portable electronic device. In addition, the padding may be configured to provide support and stability to the portable electronic device. In addition, the padding may be configured to prevent the support member from scratching the portable electronic device.

Holding members of portable electronic device holders (also "holders" herein) of embodiments of the invention may have various shapes, sizes and configurations. In an embodiment, a holding member may be disposed atop a support member or rotating member of the holder, and configured such that a user grips the holding member and moves the holder, including the portable electronic device attached to the holder. In another embodiment, a holding member may be formed in a support member or rotating member of the holder, and configured such that a user inserts the users fingers into a slot of the holding member to grip (or hold) the holder.

Figure 4A:
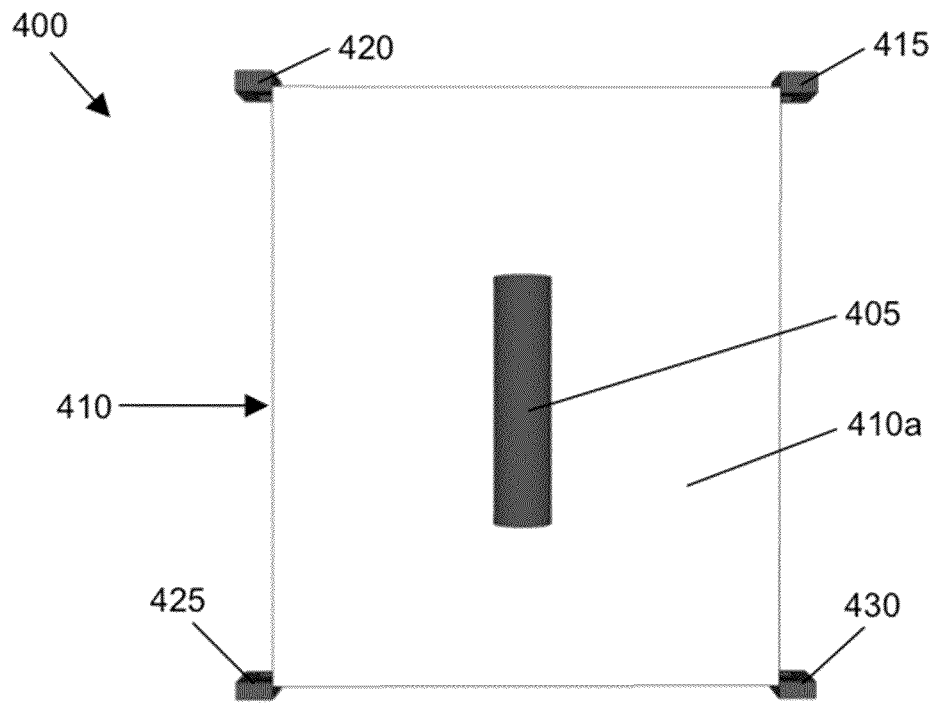
FIG. 4A is a schematic perspective front view of a portable electronic device holder (also "holder" herein) in accordance with an embodiment of the invention.

With reference to FIG. 4A, a PEDH 400 is shown, in accordance with an embodiment of the invention. The PEDH 400 comprises a holding member and a support member 410. The holding member 405 is disposed atop a front side 410*a* of the support member 410. The PEDH 400 further comprises a first mounting member 415, second mounting member 420, third mounting member 425 and fourth mounting member 430. Each of the mounting members 415, 420, 425 and 430 is configured to mount a portable electronic device, such as, e.g., a tablet PC (e.g., Apple iPad) or smart phone. In the illustrated embodiment, the mounting members 415, 420, 425 and 430 are configured to mount edge portions of a portable electronic device—e.g., the first mounting member 415 is configured to mount a top right (or bottom left) edge of a portable electronic device. In other embodiments, the mounting members of the PEDH 400 may be configured to mount one or more of (and any combination of) side, edge, front and back portions of a portable electronic device. In an embodiment, the first and second mounting members 415 and 420 may be configured to mount one of top and bottom portions of a portable electronic device, and the third and fourth mounting members 425 and 430 may be configured to mount the other of top and bottom portions of the portable electronic device.

Figure 4B:
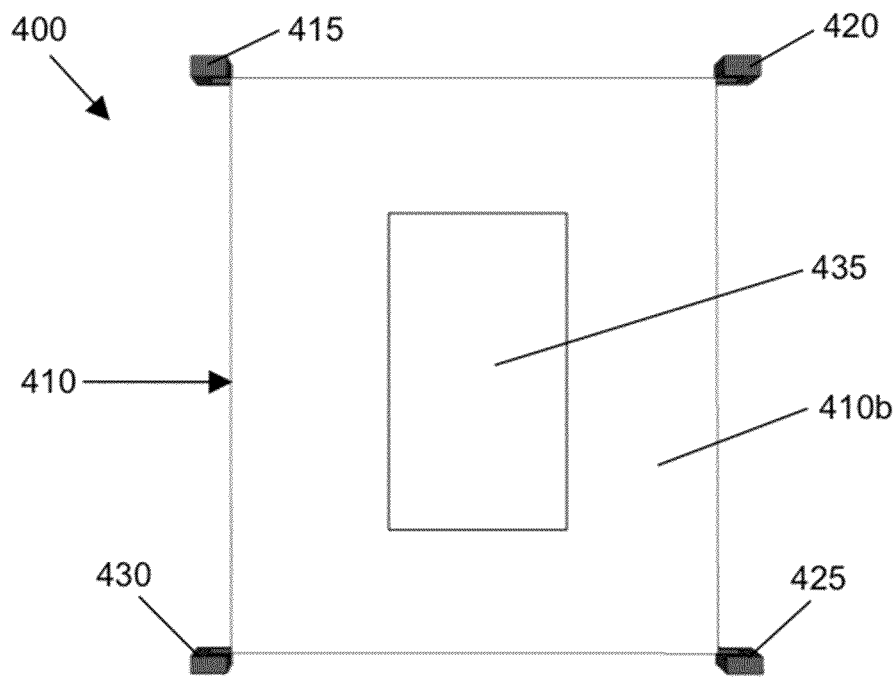
FIG. 4B is a schematic perspective back view of the holder of FIG. 4A, in accordance with an embodiment of the invention.

With reference to FIG. 4B, the support member 410 of the PEDH 400 includes a back side 410*b* that is configured to be disposed adjacent a portable electronic device. Optionally, the support member may include a padding member 435 formed of a soft or pliable material, such as foam. The thickness of the padding member 435 may be selected as desired to provide support and padding to a back side of the portable electronic device once the holder has mounted the portable electronic device.

While the PEDH 400 includes one padding member 435, it will be appreciated that the PEDH 400 may include any number of padding members. In an embodiment, the PEDH 400 may include 1 or more padding members, or 2 or more padding members, or 3 or more padding members, or 4 or more padding members, or 5 or more padding members. The padding members may have various shapes and sizes. In an embodiment, the shapes of the cross-sectional shapes of the padding members may be selected from circular, triangular, square, rectangular, pentagonal, hexagonal, heptagonal and octagonal.

In embodiments, the support member 410 may have various shapes, designs and sizes. In an embodiment, the support member 410 has a size that is between about 1 inch and 10 inches, or between about 3 inches and 9 inches. The support member 410 may have a shape or design selected from circular, triangular, square, rectangular, hexagonal, heptagonal and octagonal. Alternatively, the support member 410 may have a shape or design that is the combination of shapes. The design or shape of the support member 410 may be selected for aesthetic appeal and minimizing material use while retaining the functionality of the support member 410.

Figure 4C:
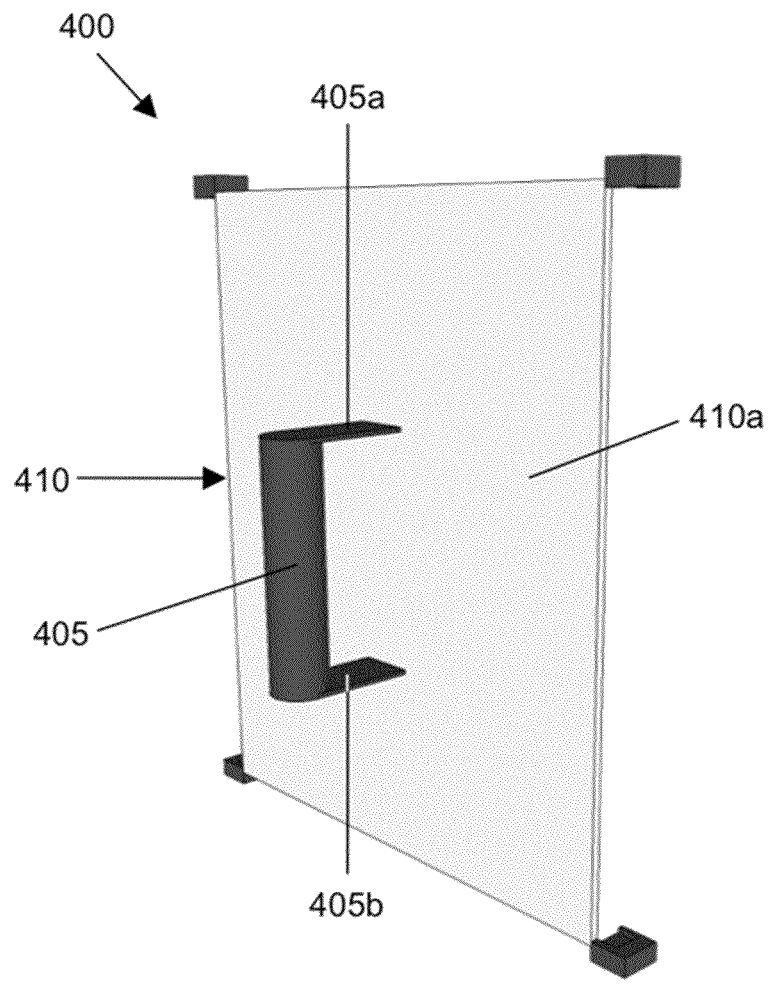
FIG. 4C is a schematic perspective side view of the holder, in accordance with an embodiment of the invention.

With reference to FIG. 4C, a perspective side view of the holder 400 is shown, in accordance with an embodiment of the invention. The holding member (or holder) 405, as illustrated, is cylindrical in shape. It will be appreciated that the holding member 405 may have other shapes and configurations, such as circular, oval, ring-like, triangular, box-like or rectangular.

In embodiments, the holding member 405 may be attached (or connected to) the support member 410 via 1 or more attachment members, 2 or more attachment members, 3 or more attachment members, 4 or more attachment members, or 5 or more attachment members. In other embodiments, attachment members may be precluded, and the holding member may be directly attached to the support member. With reference to FIG. 4C, the holding member 405 is attached to the support member 405 via two attachment members, a first attachment member 405*a* and a second attachment member 405*b*. The attachment members 405*a* and 405*b* have rectangular bases that are in contact with the front side 410*a* of the support member 410. It will be appreciated, however, that the attachment members 405*a* and 405*b* may have various shapes and configurations, such as circular bases, triangular bases, square (or box-like) bases, pentagonal bases, or hexagonal bases. In an embodiment, the holding member 405 may be attached to the support member via a single attachment member.

In embodiments, the holding member 405 may be attached to the support member 410 at various points. With reference to FIGS. 4A and 4C, the holding member 405 is attached to the support member 410 at nearly the center of the support member. In other embodiments, the holding member 405 may be attached to the support member 410 at a side portion of the support member 410 or an edge portion of the support member 410.

In an alternative embodiment, the holding member 405 may be unitary (or single piece) with the support member 410. In such a case, during the manufacturing process of the holder 400, the holding member 405 and the support member may be formed of the same material. For example, the holding member 405 and the support member 410 may be formed of a polymeric material, and they may be formed at the same time or in succession.

In an alternative embodiment, the holding member 405 may be a hole or groove in the support member 410 (see below). In such a case, the holding member 405 may be formed in or from the same material as the support member 410.

The holder 400 can be configured for use with various portable electronic devices. For example, the holder 400 can be configured for use with a tablet PC.

Figure 4D:
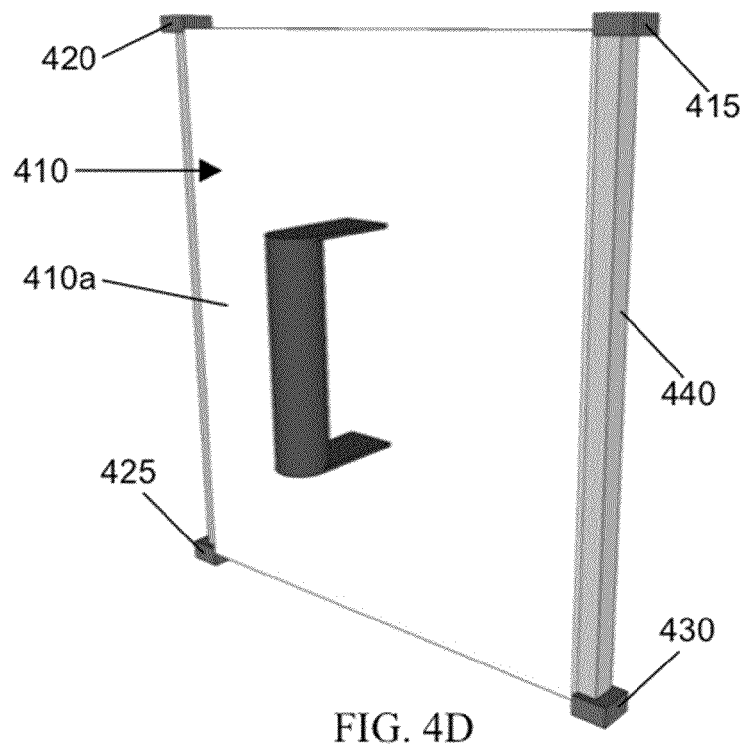
FIGS. 4D and 4E schematically illustrate the holder of FIG. 4A mounted on a portable electronic device, in accordance with an embodiment of the invention.
Figure 4E:
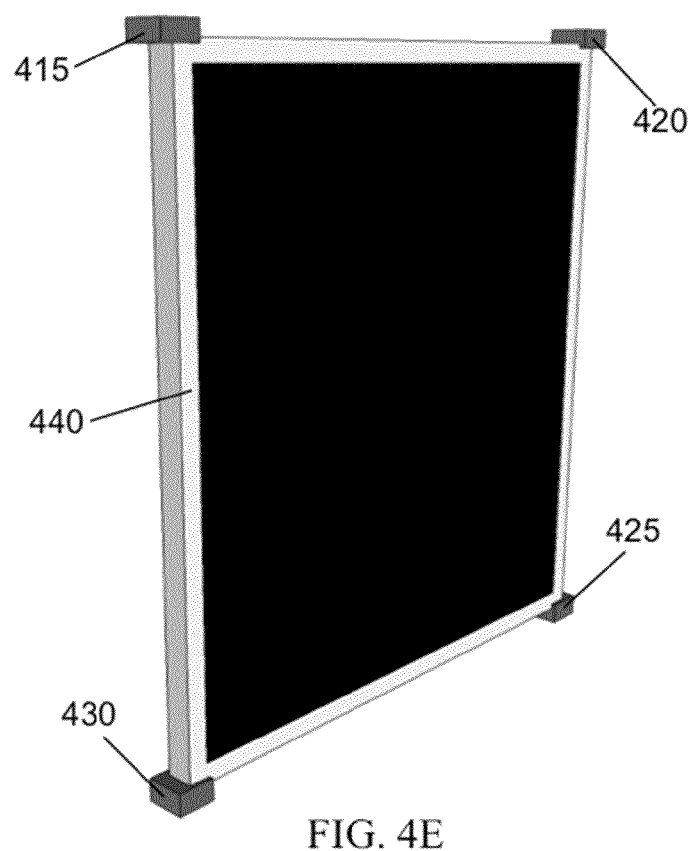

With reference to FIGS. 4D and 4E, the holder 400 has been mounted on a tablet PC 440, in accordance with an embodiment of the invention. The mounting members 415, 420, 425 and 430 are attached to edge portions of the tablet PC 440.

With continued reference to FIGS. 4D and 4E, in an embodiment, the mounting members 415, 420, 425 and 430 may be removably attachable to the support member 410. This may permit the user to remove one or more of the mounting members 415, 420, 425 and 430 from the holder 400 to enable the user to mount the one or more of the mounting members 415, 420, 425 and 430 to the portable electronic device. In another embodiment, one or more of the mounting members 415, 420, 425 and 430 may be extendable from, and retractable to, the support member 410. This may permit a user to mount the mounting members 415, 420, 425 and 430 on portable electronic devices. Additionally, this may permit the user to mount the mounting members 415, 420, 425 and 430 on portable electronic devices of various sizes. In another embodiment, one or more of the mounting members 415, 420, 425 and 430 may have adjustable lengths (as measured along an axis orthogonal to a side of the support member 410). This may permit a user to mount the holder 400 on portable electronic devices of various sizes.

In an embodiment, the holder 400 (in addition to other holders described herein) may include a closable flap (not shown) (also "flap" and "flap member" herein) attached to the support member 410, the closable flap and the support member 410 defining a space configured to hold a portable personal computer. The closable flap may be configured to rotate away from and toward the support member. In an embodiment, with the closable flap in an "open" configuration (i.e., rotated away from the support member 410), the user may mount the tablet PC (or slate) 440 to the mounting members 415, 420, 425 and 430. The user may then bring the closable flap to a "closed" configuration (i.e., rotate the flap toward the support member 410), thereby covering a front surface of the tablet PC 440 from view. In an embodiment, closing the closable flap may at least partially conceal the tablet PC from view. In another embodiment, closing the closable flap may fully conceal the tablet PC from view. The closable flap may aid in protecting a top surface (e.g., screen) of the tablet PC 440.

In an embodiment, the support member 410 may be formed of a polymeric material. In another embodiment, the support member 410 may be formed of a metallic material, such as an elemental metal or a metal alloy. In an embodiment, the support member 410 may be formed of aluminum. The support member 410 may be coated with a scratch resistant layer, a glossy layer, or both.

In an embodiment, the support member 410 may include an inner layer formed of a first material and an outer layer formed of a second material. In an embodiment, the inner layer may have a first hardness that is less than a second hardness of the outer layer. In an embodiment, the inner layer may be formed of foam or a polymeric material, and the outer layer may be formed of a metallic material or a polymeric material.

In an embodiment, the support member 410 includes a layer of material that circumscribes an empty space. The empty space may be under vacuum, filled with air or an inert gas.

In an embodiment, one or both of the front side 410a and the back side 410b of the support member is customizable with one or more of a design (e.g., decorative design) a color, shape(s) and pattern(s). In an embodiment, the front side 410a is customizable by a user to include a particular user-defined color or one or more shapes (or designs). In an embodiment, one or both of the front side 410a and the back side 410b may be configured to accept user-customizable skins, wherein the skins include particular shapes, designs and/or colors.

In embodiments, a portable electronic device holder ("PEDH") comprises a support member, holding member, and one or more mounting members configured to mount a portable electronic device. One or more of the mounting members may be unitary (or single piece) with the support member. In addition, one or more of the mounting members may have adjustable lengths.

With reference to FIGS. 5A-5D, a PEDH 500 comprises a holding member 505, support member 510, a first mounting member 515 and a second mounting member 520. The first and second mounting members 515 and 520 are single-piece with the support member 520. In an embodiment, the first and second mounting members 515 and 520 are formed of the same material as the support member 510.

Figure 5A:
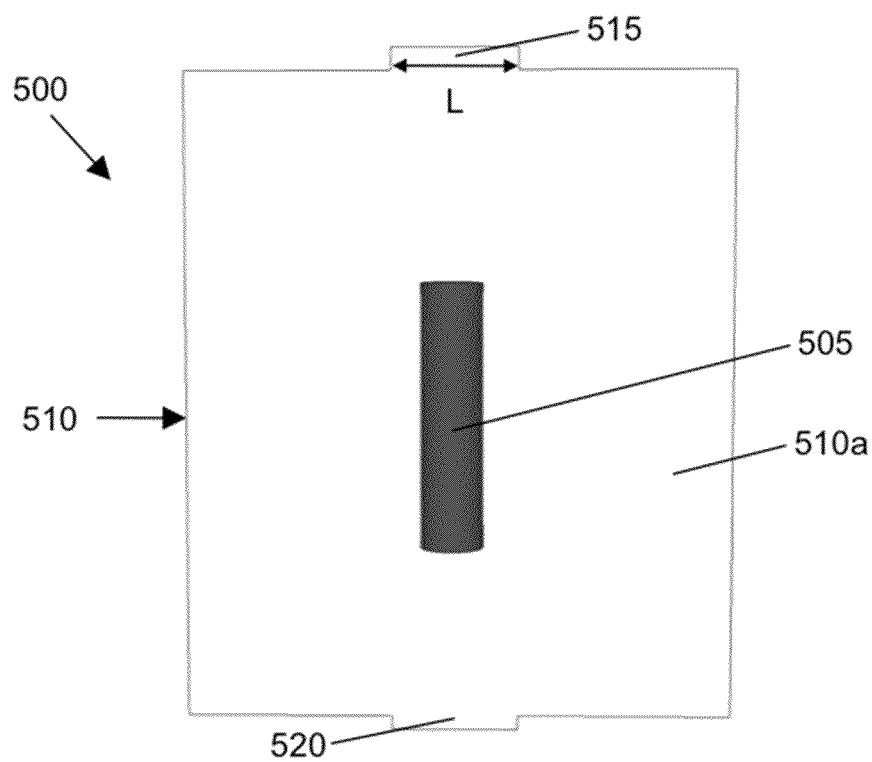
FIG. 5A is a schematic front view of a portable electronic device holder, in accordance with an embodiment of the invention.
Figure 5B:
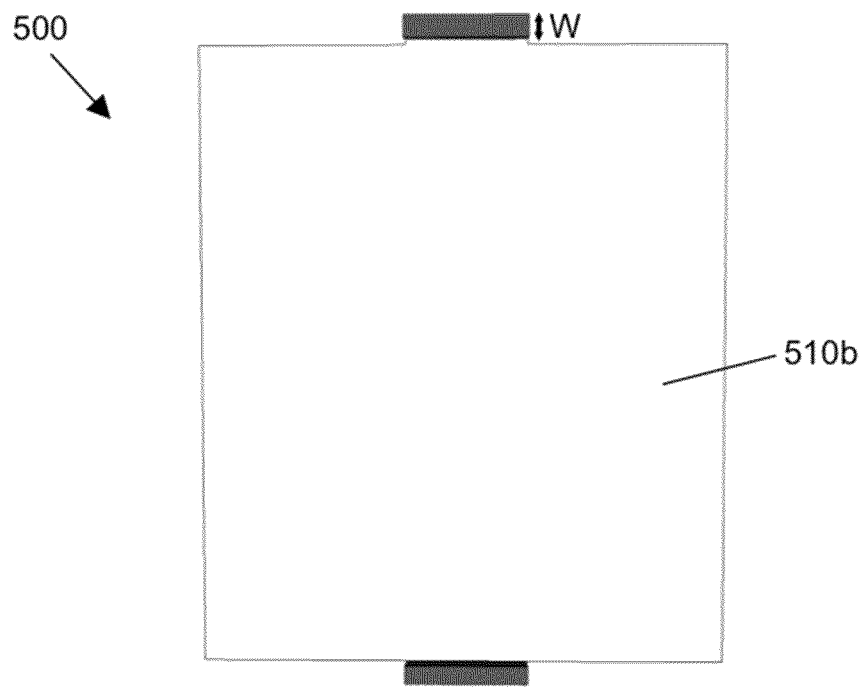
FIG. 5B is a schematic back view of the holder of FIG. 5A, in accordance with an embodiment of the invention.

With reference to FIGS. 5A and 5B, the first mounting member 515 has a width (as measured along an axis orthogonal to a top edge of the support member 510; the length of the first mounting member 515 has been indicated by 'W') that is larger than a width of the second mounting member. This may permit a user to bend the first support member 515 back (along an axis orthogonal to a plane parallel to the support member 510) for mounting a portable electronic device. In another embodiment, the first mounting member 515 and the second mounting member 520 have the same width. In yet another embodiment, one or both of the first and second mounting members 515 and 520 have widths that are adjustable by a user. In an embodiment, one or both of the first and second mounting members 515 and 520 may have preset widths.

With continued reference to FIGS. 5A and 5B, the first and second mounting members 515 and 520 have lengths (as measured along an axis parallel to a top or bottom edge of the support member 510; the length of the first mounting member 515 has been indicated by 'L') that are less than the width of the support member 510. In embodiments, the first and second mounting members 515 and 520 may have lengths that are less than or equal to a width of the support member 510.

In embodiments, the holder 500 may include 1 or more, 2 or more, 3 or more, 4 or more, or 5 or more holding members. With reference to FIG. 5A, while the holder 500 comprises a single holding member 505, the holder 500 may include a plurality of holding members. In an embodiment, the holder 500 may include two holding members. The two holding members may be disposed adjacent one another. Such a configuration may provide for versatility in handling of the holder 500.

With reference to FIG. 5B, the support member 510 comprises a front side (or front surface) 510a and a back side (or back surface) 510b. The front side 510a is configured to be disposed away from a portable electronic device when the holder 500 has mounted the portable electronic device. The back side 510b is configured to be disposed adjacent the portable electronic device when the holder 500 has mounted the portable electronic device.

Figure 5C:
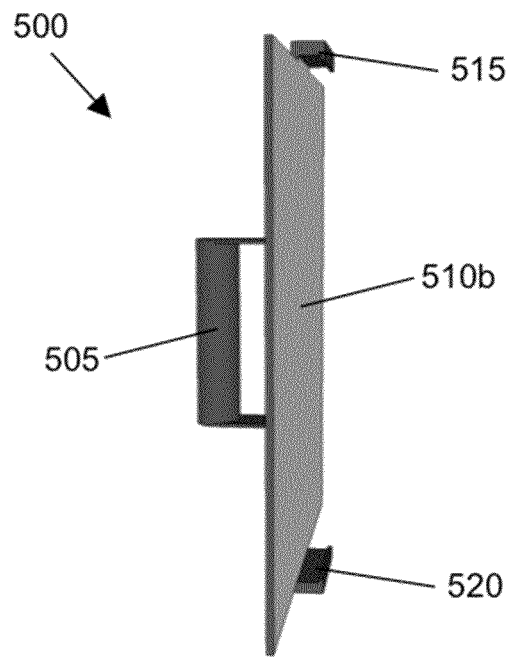
FIG. 5C is a schematic perspective right side view of the holder of FIG. 5A, in accordance with an embodiment of the invention.
Figure 5D:
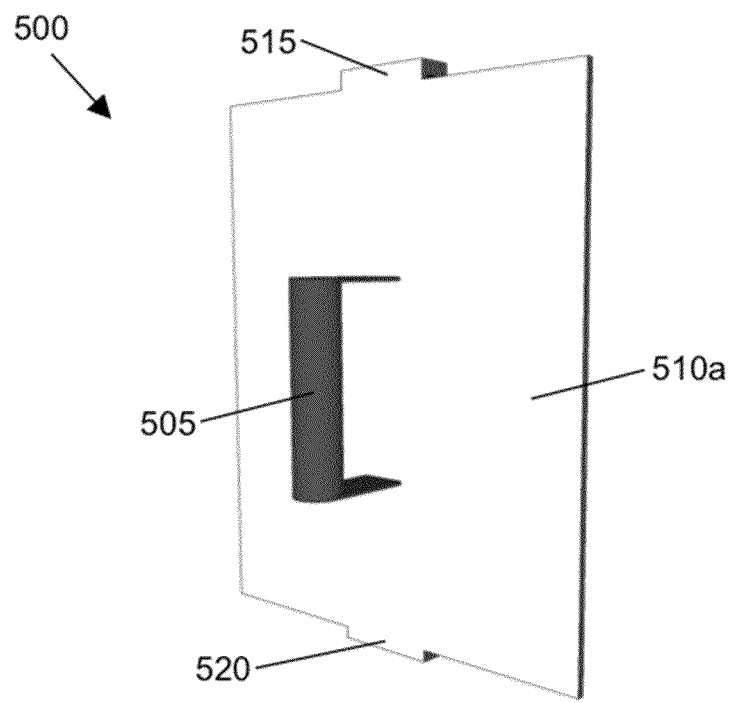
FIG. 5D is a schematic perspective front side view of the holder of FIG. 5A, in accordance with an embodiment of the invention.

With reference to FIGS. 5C and 5D, in perspective backside and front-side views of the PEDH 500, respectively, each of the mounting members 515 and 520 has a first surface for coming in contact with a front surface of a portable electronic device and a second surface for coming in contact with a top or bottom edge of the portable electronic device. The first mounting member 515 has a third surface for coming in contact with a back surface of the portable electronic device. In an embodiment, the back side 510b is configured to come in contact with a back side (or back surface) of the portable electronic device. In an embodiment, the back side 510b may include one or more padding members, as described above. The holding member 505 is attached to the support member 510 at the front side 510a of the support member 510.

In an aspect of the invention, a portable electronic holder is provided having a support member, one or more mounting members, and a holding member that is rotatable. In embodiments, the holding member is rotatable along an axis orthogonal to a plane parallel to the support member.

Figure 6A:
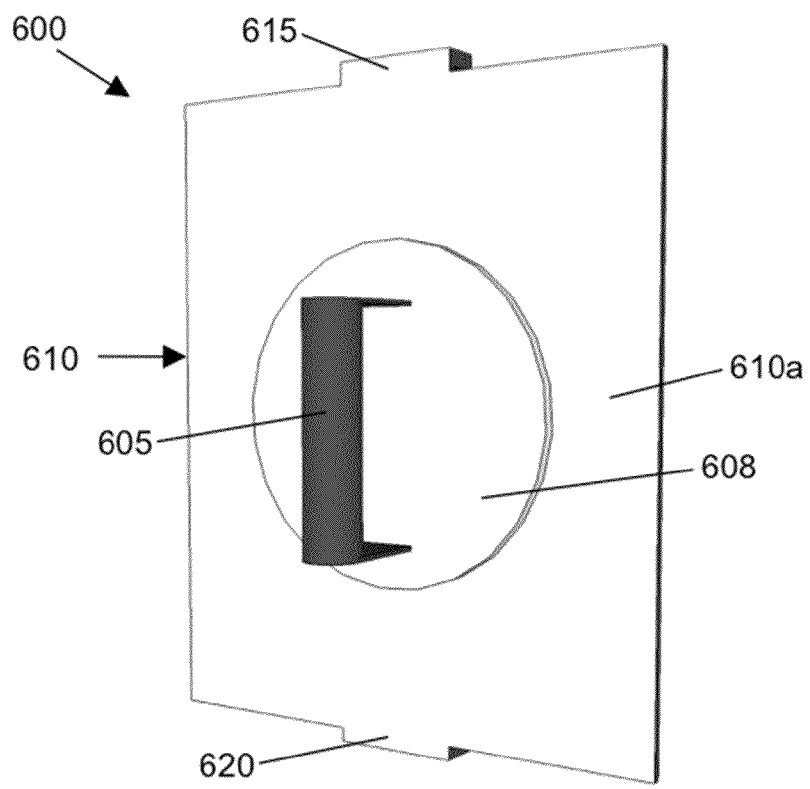
FIG. 6A is a schematic perspective side view of a portable electronic device holder, in accordance with an embodiment of the invention.
Figure 6B:
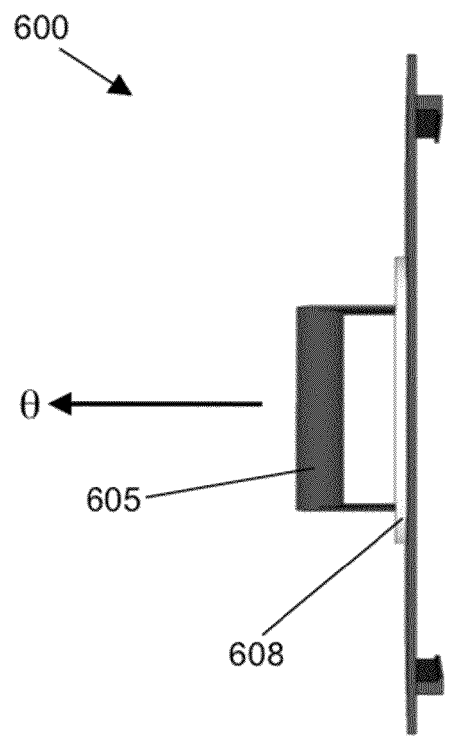
FIG. 6B is a schematic side view of the holder of FIG. 6A, in accordance with an embodiment of the invention.

With reference to FIG. 6A, a portable electronic device holder (also "holder" herein) 600 is shown, in accordance with an embodiment of the invention. FIG. 6B is a perspective side view of the holder 600 of FIG. 6A, in accordance with an embodiment of the invention. The holder 600 includes a holding member 605 disposed atop a rotating member 608. The rotating member 608 is disposed atop a support member (also "support surface" and "support structure" herein) 610. The support member 610 includes a front side 610a and back side 610b. The holder 600 further includes a first mounting member 615 and a second mounting member 620. The mounting members 615 and 620 are configured to mount (or attach) the holder 600 to a portable electronic device, such as, e.g., a tablet PC (e.g., iPad). The mounting members 615 and 620 may be similar to other mounting members described herein.

In embodiments, the holder 600 may include one or more padding members on a back side of the support member 610 (see above).

Figure 6C:
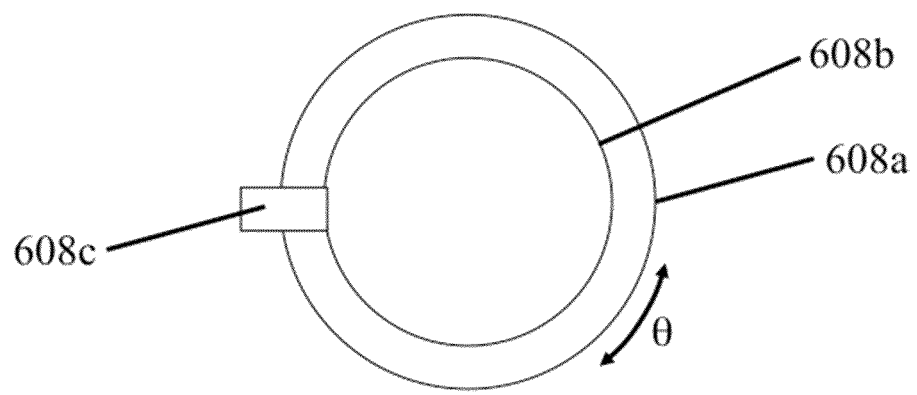
FIG. 6C is a schematic cross-sectional top view of a rotating member of the holder of FIG. 6A, in accordance with an embodiment of the invention.

With continued reference to FIGS. 6A and 6B, the rotating member 608 is configured to permit the holding member 605 to rotate along an axis orthogonal to a plane parallel to the support member 610 (see FIG. 6B, axis θ). With reference to FIG. 6C, in an embodiment, the rotating member 608 includes an outer structure 608a and an inner structure 608b. The outer structure 608a is attached to the holding member 605, and the outer structure 608a circumscribes the inner structure 608b. The inner structure 608b is attached to the support member 610. The outer structure 608a is configured to rotate in relation to the inner structure 608b, thereby permitting the holding member 605 to rotate in relation to the support member 610. A locking mechanism 608c may hold the outer structure 608a against the inner structure 608b, preventing the outer structure 608a from rotating with respect to the inner structure 608b. In an alternative embodiment, the holding member is attached to the inner structure 608b, which is configured to rotate in relation to the outer structure 608a that is attached to the support member 610.

Figure 6D:
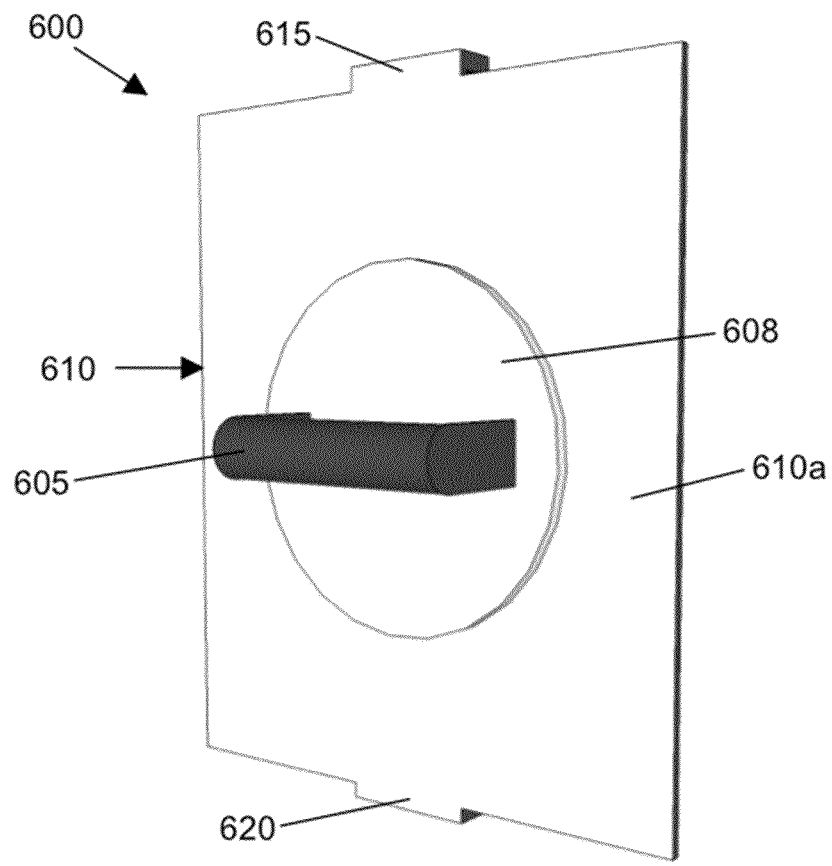
FIG. 6D is a schematic perspective side view of the holder of FIG. 6A, in accordance with an embodiment of the invention.

FIG. 6D illustrates a perspective side view of the holder 600, in accordance with an embodiment of the invention. The holding member 605 of FIG. 6C has been rotated by about 90° with respect to its initial angular position, as shown in FIGS. 6A and 6B. In some embodiments, the rotating member 608 is configured to permit a user to rotate the holding member 605 by any angle with respect to the support member 610. In other embodiments, the rotating member 608 is configured to permit a user to rotate the holding member 605 by discrete angles with respect to the support member 610. In an embodiment, the rotating member 608 is configured to permit the user to rotate the holding member by about 5° increments, 10° increments, 15° increments, 20° increments, 25° increments, 30° increments, 35° increments, or 40° increments, 45° increments, 50° increments, 55° increments, 60° increments, 65° increments, 70° increments, 75° increments, 80° increments, 85° increments, or 90° increments with respect to the support member 610. It will be appreciated, however, that any degree of discrete increment is possible.

In an alternative embodiment, the rotating member 608 is removably attachable to the support member 610. In such a case, a user may remove the rotating member 608 from the support member 610. In an embodiment, the user may subsequently attach a holding member to the support member and operate the holder 600 without the rotating member 608. In an embodiment, the holding member 605 is removably attachable to the rotating member 608, and the user reattaches the holding member 605 to the support member 610 to use the holder 600 without the rotating member 608.

In embodiments, the holder 600 may include any number of mounting members. In embodiments, the holder 600 may include 1 or more mounting members, or 2 or more mounting members, or 3 or more mounting members, or 4 or more mounting members. Additionally, the mounting members may be disposed at various locations of the support member 610. In an embodiment, the mounting members may be disposed at edge and/or side portions of the support member 610.

In an embodiment, at least portions of each of the mounting members 615 and 620 of the holder 600 may be single-piece (or unitary) with the support member 610. With reference to FIG. 6A, in an embodiment, the first mounting member 615 and second mounting member 620 are unitary with the support member 610. In other embodiments, at least a portion of each of the mounting members 615 and 620 may be single-piece with the support member 610. In an embodiment, each of the mounting members 615 and 620 includes a first portion that is parallel to, and an extension of, the support member 610. In such a case, other portions of the mounting members 615 and 620 may be single piece with the first portion. Alternatively, the mounting members 615 and 620 may include other portions that are not single-piece with the first portions of the mounting members 615 and 620, but are attached to the first portions of the mounting members 615 and 620.

While the portable electronic device holder 600 includes two mounting members, at least portions of which are single piece with the support member 610, in other embodiments, the holder 600 may include any number of mounting members. In an embodiment, the mounting members are not single piece with the support member 610.

With reference to FIGS. 7A-7D, a portable electronic device holder 700 is shown having a holding member 705, rotating member 708, support member 710, first mounting member 715, second mounting member 720, third mounting member 725, and fourth mounting member 730, in accordance with an embodiment of the invention. The mounting members 715, 720, 725 and 730 are not single-piece with the support member 710. The support member 710 includes a front side (or front surface) 710a and a back side (or back surface) 710b.

Figure 7A:
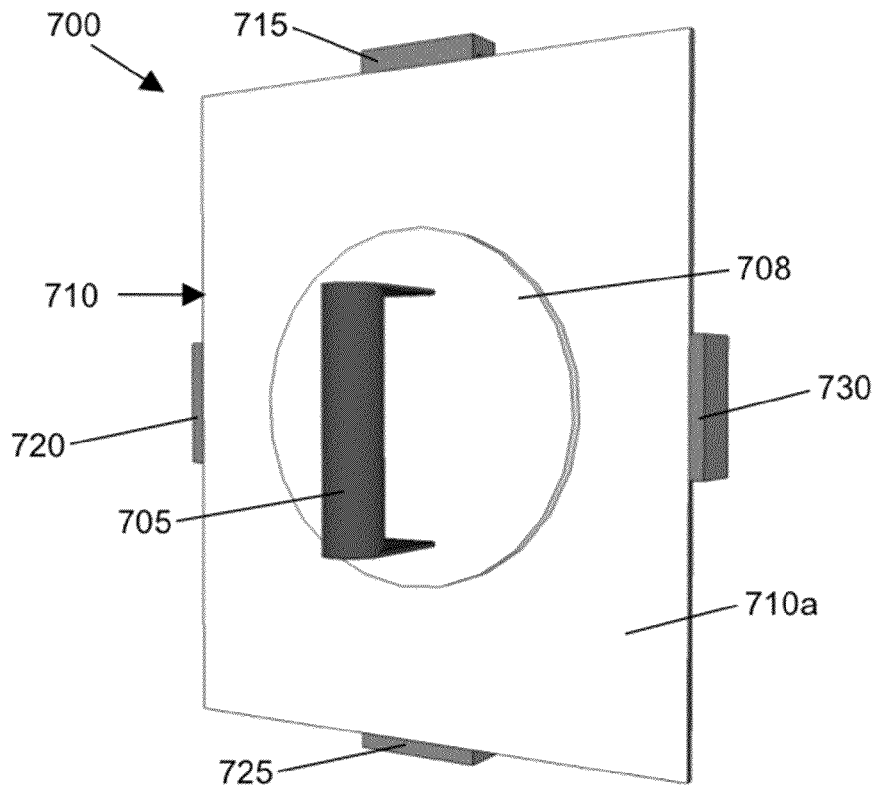
FIG. 7A is a schematic perspective side view of a portable electronic device holder, in accordance with an embodiment of the invention.
Figure 7B:
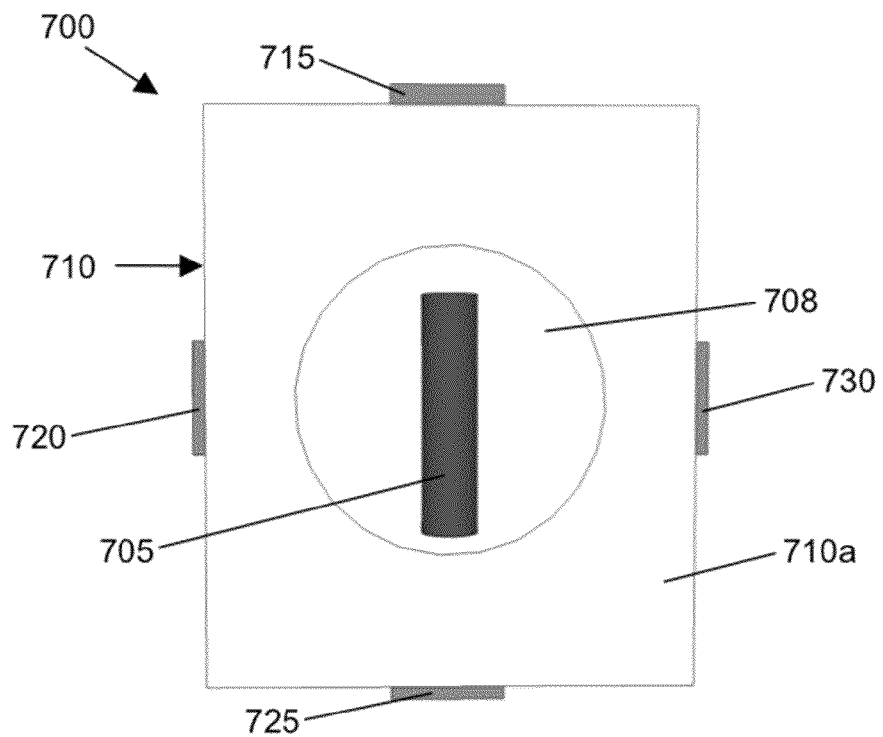
FIG. 7B is a schematic front view of the holder of FIG. 7A, in accordance with an embodiment of the invention.

With reference to FIG. 7B, the mounting members 715, 720, 725 and 730 are disposed at side portions of the support member 710—i.e., the first mounting member 715 is disposed at a top side portion of the support member 710, the second mounting member 720 is disposed at a left side portion of the support member 710, the third mounting member 725 is disposed at a bottom side portion of the support member 710, and the fourth mounting member 730 is disposed at a right side portion of the support member 710. In another embodiment, the mounting members 715, 720, 725 and 730 may be disposed at edge portions of the support member 710. In yet another embodiment, the mounting members 715, 720, 725 and 730 may be located at any combination of side and edge portions of the support member 710. For example, the first mounting member 715 and third mounting member 725 may be located at top side and bottom side portions of the support member 710 (as illustrated), and the second mounting member 720 and fourth mounting member 730 may be located at top-left and top-right edge portions of the support member 710.

Figure 7C:
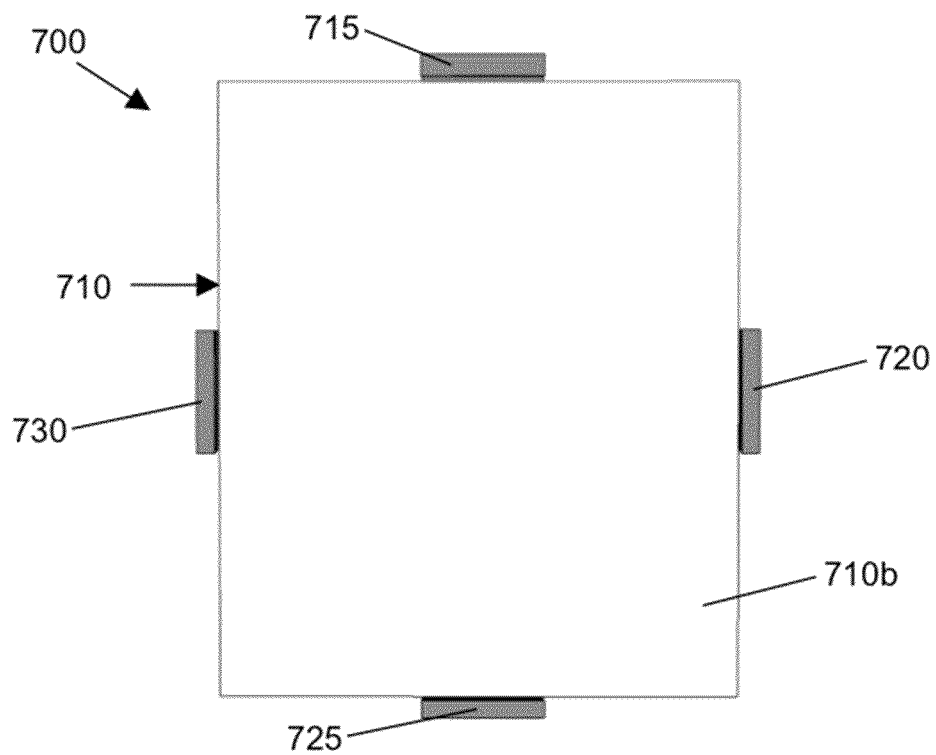
FIG. 7C is a schematic back view of the holder of FIG. 7A, in accordance with an embodiment of the invention.
Figure 7D:
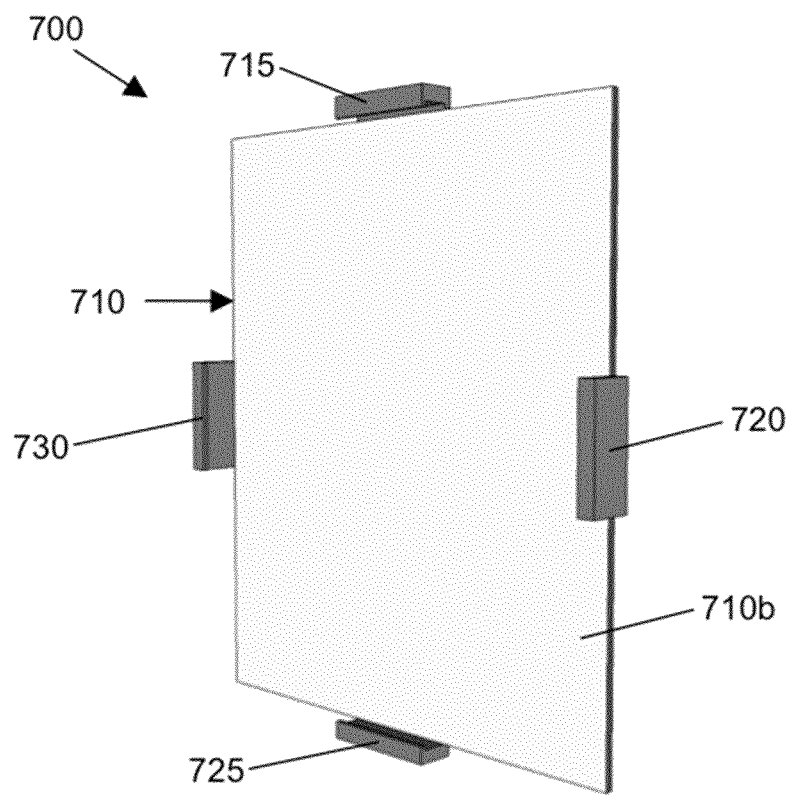
FIG. 7D is a schematic perspective back side view of the holder of FIG. 7A, in accordance with an embodiment of the invention.

With reference to FIG. 7C, the back side of the holder 700 is shown, in accordance with an embodiment of the invention. The mounting members 715, 720, 725 and 730 include structures that are disposed perpendicularly with respect to the back side 710b of the support member 710. With reference to FIG. 7D, the third mounting member 725 includes a structure that is disposed perpendicularly with respect to the back side 710b of the support member 710.

With reference to FIGS. 7C and 7D, each of the mounting members 715, 720, 725 and 730 includes a first portion that is parallel to the back surface 710b of the support member 710 and a second portion that is perpendicular to the back surface 710b of the support member 710. In an embodiment, the first portion may be rotatable with respect to the second portion. The first mounting member 715 additionally includes a third portion that is parallel to the back surface 710b of the support member 710. The third portion may be rotatable with respect to the support member 710. In another embodiment, one or more of the second, third and fourth mounting members 720, 725 and 730, respectively, may include third portions. The third portions may be rotatable with respect to the support member 710. In an embodiment, the length of the third portion may be adjustable. In yet another embodiment, none of the mounting members includes a third portion.

In an embodiment, one or more of the mounting members 715, 720, 725 and 730 are removably attachable to the support member 710. That is, the mounting members 715, 720, 725 and 730 may be attached, removed and reattached (not necessarily in that order). This may advantageously permit a user to mount the holder 700 to portable electronic devices of various sizes. In another embodiment, one or more of the mounting members 715, 720, 725 and 730 may have first and second portions with adjustable lengths.

In an embodiment, one or more of the mounting members 715, 720, 725 and 730 may be extendable from and retractable to the support member 710. In an embodiment, one or more of the mounting members 715, 720, 725 and 730 may be self-retractable, such as, e.g., with the aid of a coil mechanism (e.g., spring-loaded coil) or one or more rubber bands. In an embodiment, the holder 700 may include a locking mechanism to hold a mounting member at a predetermined distance from the support member 710. In an embodiment, the third portion of the first mounting member 710 is extendable from and retractable to the support member 710, and the holder 700 includes a locking mechanism (not shown) that permits a user to lock the first mounting member 715 at a predetermined lateral position with respect to the support member 710.

In some embodiments, the mounting members 715, 720, 725 and 730 may be configured for use with particular portable electronic devices. In such cases, the mounting members 715, 720, 725 and 730 may be sized for use with particular portable electronic devices, such as, for example, a certain tablet PC.

With reference to FIGS. 7C and 7D, each of the mounting members 715, 720, 725 and 730 are configured to come in contact with a front surface of a portable electronic device. Additionally, each of the mounting members 715, 720, 725 and 730 is configured to come in contact with side portions of a portable electronic device. The first mounting member 715 is configured to come in contact with a back portion of a portable electronic device.

In an aspect of the invention, a portable electronic device holder ("PEDH") is provided having a support member, one or more mounting members attached to the support member, and holding member with grooves or holes for a user's fingers. In an embodiment, the PEDH may include a rotating member to enable the user to rotate the holding member with respect to the support member. In an embodiment, one or more of the mounting members may be attached to the support member via a rotating member to permit the user to rotate one or more of the mounting members in relation to the support member.

In an embodiment, the one or more mounting members may be unitary with the support members. In another embodiment, the one or more mounting members may be separate from the support member (e.g., formed of separate components and/or material).

Figure 8A:
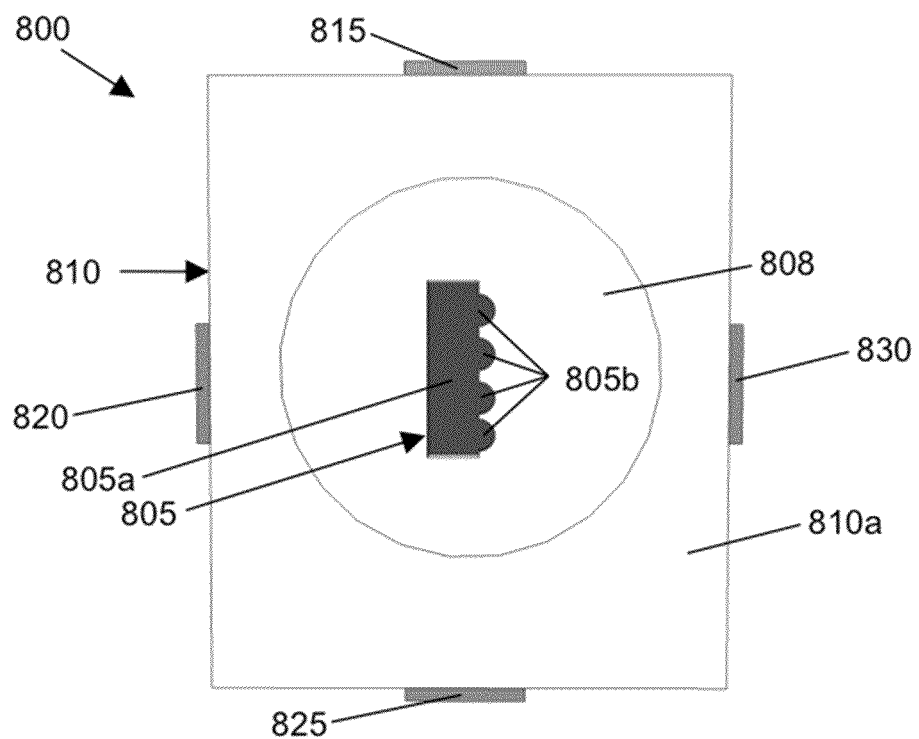
FIG. 8A is a schematic front view of a portable electronic device holder, in accordance with an embodiment of the invention.

With reference to FIG. 8A, a PEDH (also "holder" herein) 800 is shown, in accordance with an embodiment of the invention. The holder 800 includes a holding member 805, a rotating member 808 attached to the holding member 805, a support member 810 attached to the rotating member 808, a first mounting member 815, a second mounting member 820, a third mounting member 825 and a fourth mounting member 830. In the illustrated embodiment, the mounting members 815, 820, 825 and 830 are formed of components that are separate from the support member 810. In an alternative embodiment, one or more components of the mounting members 815, 820, 825 and 830 may be unitary (or single-piece) with the support member 810. The holding member 805 includes a slot 805a and holes (also "finger holes" herein) 805b adjacent the slot 805a. The support member 810 includes a front side 810a and a back side 810b. In an alternative embodiment, the holding member 805 may include the slot 805a without finger holes 805a. In another embodiment, the holding member 805 may include the finger holes 805a without the slot 805a.

Figure 8B:
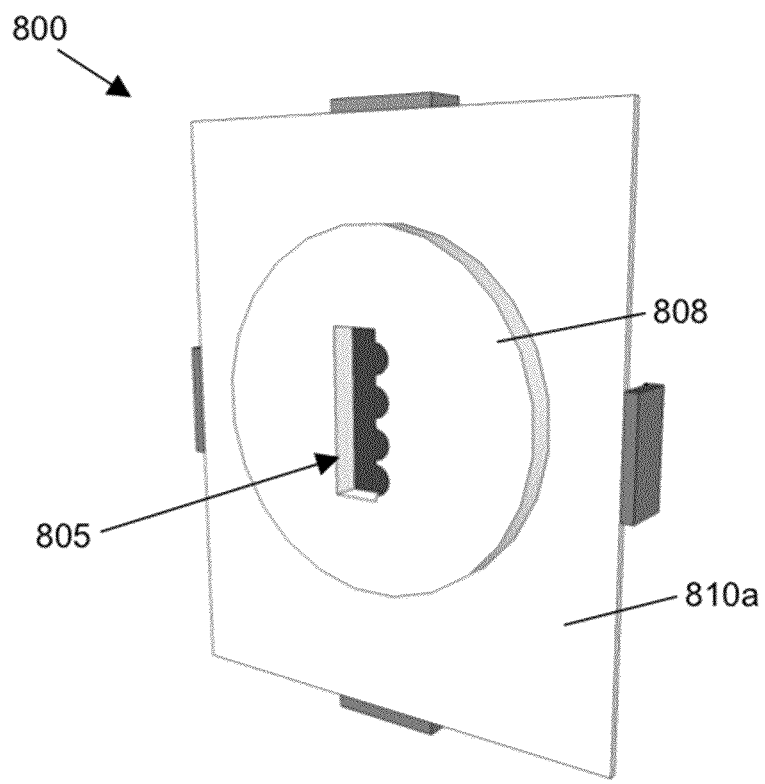
FIG. 8B is a schematic perspective side view of the holder of FIG. 8A, in accordance with an embodiment of the invention.

With reference to FIG. 8B, the slot 805a of the holding member 805 protrudes into the rotating member 808. The slot 805a is configured to permit a user to insert the user's fingers into the holding member 805 to hold the holder 800. The finger holes 805b are configured to permit a user to insert one or more of the user's fingers into the finger holes 808b for improved handling of the holder 800. The rotating member 808, as illustrated, sits on top of the support member 810. In other embodiments, the rotating member 808 may be formed in the support member 810, or from the same material as the support member 810. In an embodiment, one or more components of the rotating member 808 are unitary with the support member. In an alternative embodiment, the rotating member 808 may be precluded, and the holding member 805 may be formed in the support member 810 or another layer atop the support member 810.

Figure 8C:
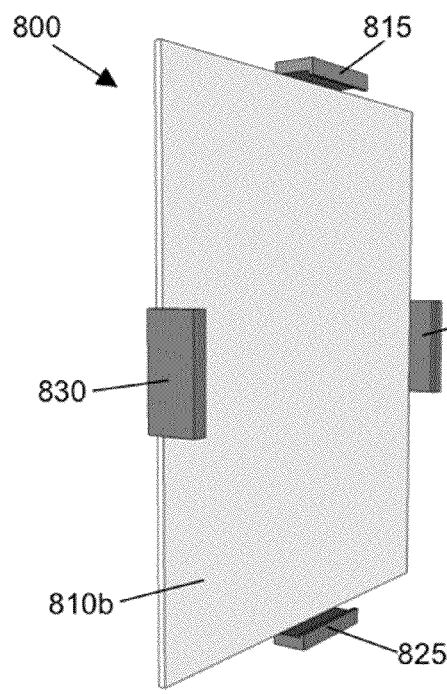
FIGS. 8C and 8D are schematic perspective back side view of the holder of FIG. 8A, in accordance with an embodiment of the invention.
Figure 8D:
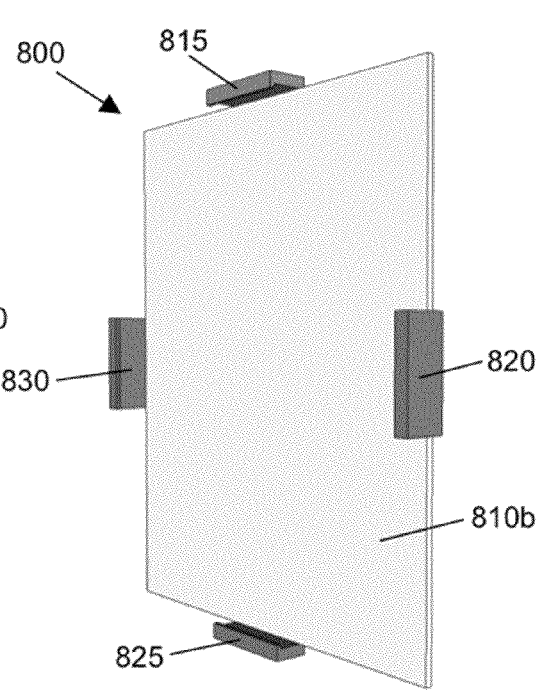

FIGS. 8C and 8D are schematic perspective back side views of the holder 800, in accordance with an embodiment of the invention. The mounting members 815, 820, 825 and 830 may be as described in other embodiments of the invention. The mounting members 815, 820, 825 and 830 may be configured to come in contact with a front surface and sides of a portable electronic device (see above).

Figure 8E:
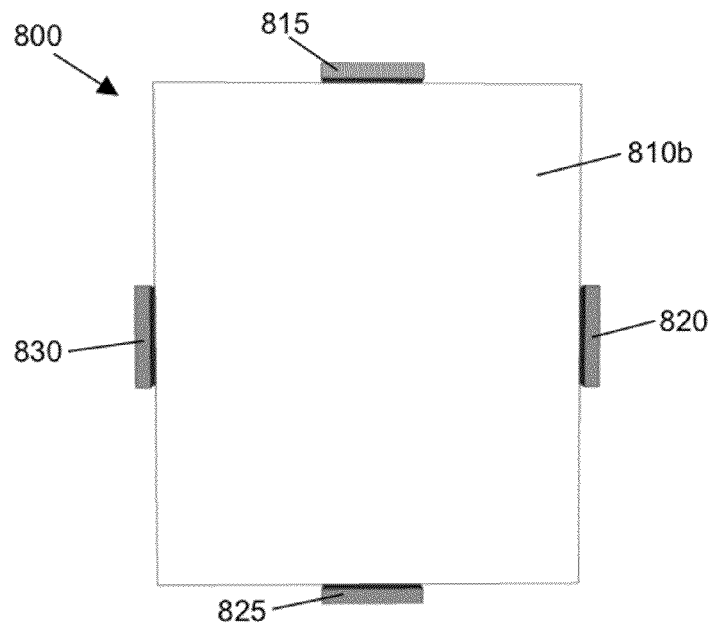
FIG. 8E is a schematic back view of the holder of FIG. 8A, in accordance with an embodiment of the invention.

FIG. 8E is a schematic back side view of the holder 800, in accordance with an embodiment of the invention. The back side 810b of the support member 810 is configured to lie adjacent a back surface of a portable electronic device when the holder 800 has mounted the portable electronic device. In an embodiment, the holder 800 may include a padding member (see above) disposed on (or over) the back side 810b of the support member 810.

Figures 8F, 8G:
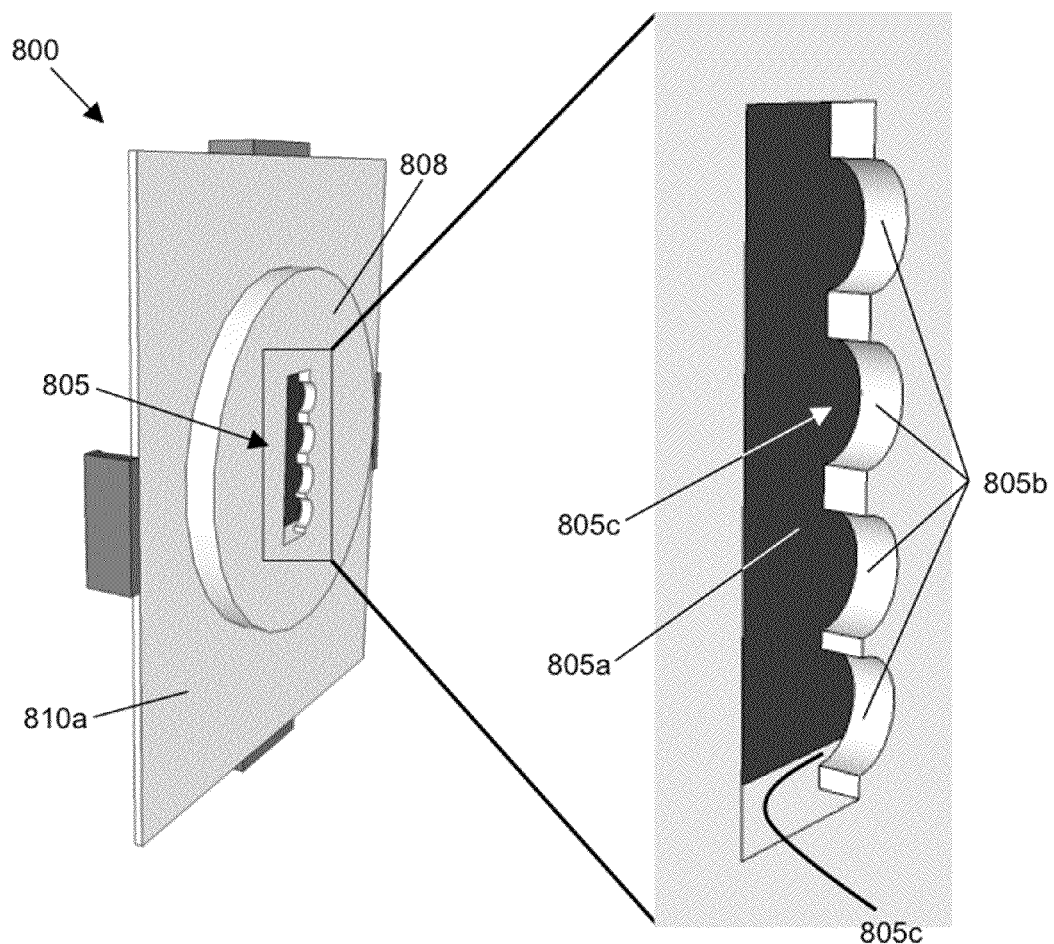
FIG. 8F is a schematic perspective front side view of the holder of FIG. 8A, in accordance with an embodiment of the invention.
FIG. 8G is a zoom-in on a holding member of FIG. 8F, in accordance with an embodiment of the invention.

FIG. 8F is a schematic perspective front side view of the holder 800, in accordance with an embodiment of the invention. FIG. 8G is a blowup of the holding member 805, in accordance with an embodiment of the invention. The finger holes 805b of the holding member 805 are positioned for a user's right hand. However, the holder 800 may be configured such that the user may rotate the holder 800 by 180° for use with the user's left hand. In an embodiment, the user may rotate the rotating member 808 by 180° to switch between left hand and right hand configurations.

With continued reference to FIG. 8G, the slot 805a includes a lower portion 805c that extends into the rotating member 808 and laterally to an area below the finger holes 805b. This may permit a user to insert the user's left or right hand, including fingers, into the finger holes 805b and into the lower portion 805c of the slot 805a. The user may then curl the user's fingers to grip the holding member 805.

Figure 8H:
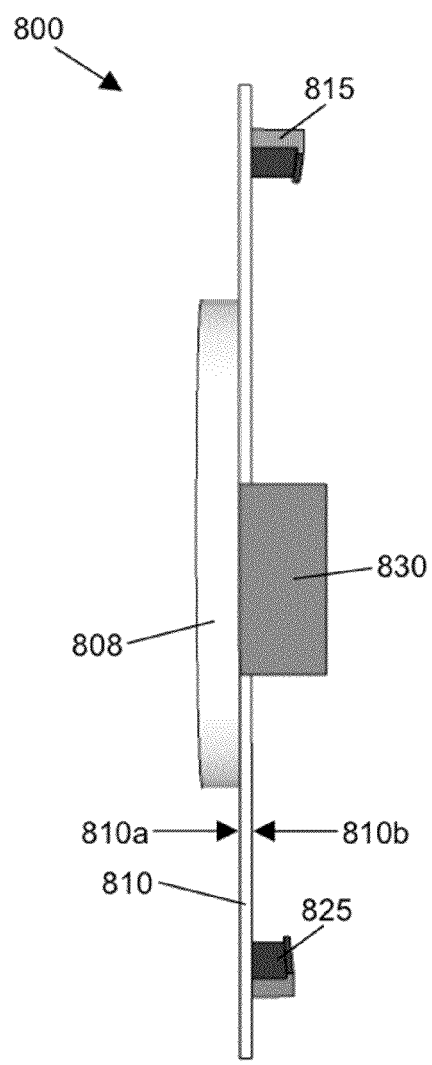
FIGS. 8H and 8I are schematic perspective right side and left side views, respectively, of the holder of FIG. 8A, in accordance with an embodiment of the invention.
Figure 8I:
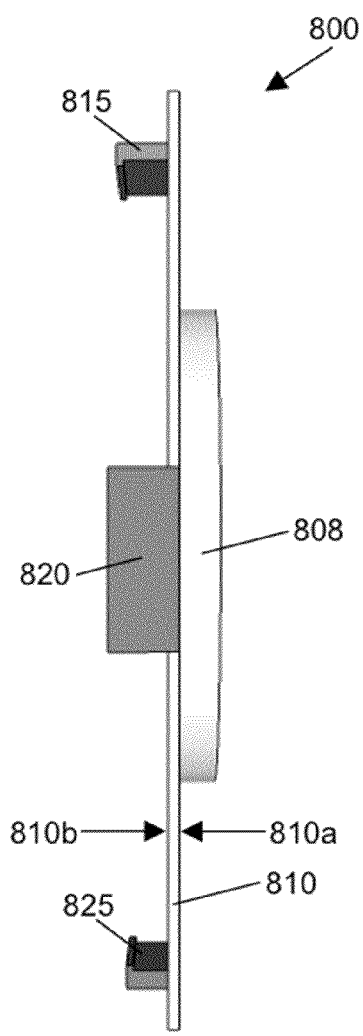

FIGS. 8H and 8I are schematic perspective right side and left side views, respectively, of the holder 800, in accordance with an embodiment of the invention. The mounting members 815, 820, 825 and 830 extend away from the holder along an axis perpendicular to the back side 810b of the support member 810.

In an alternative embodiment, the holding member 805 includes the slot 805a, but the finger holes 805b of the holding member 805 may be precluded. In such a case, the slot 805a may be configured to permit the user to insert the user's left or right hand, including fingers, into the slot 805*a* and curl the user's fingers to grip the holding member 805.

In an embodiment of the invention, the rotating member 808 may be as described above in the context of FIG. 6C. In such a case, the holding member 805 may be formed in an outer structure or inner structure of the rotating member 808. In an embodiment, the outer structure (also "outer portion" herein) of the rotating member 808 circumscribes the inner structure (also "inner portion" herein) of the rotating member, and the holding member 805 is formed in the outer structure.

In alternative embodiment, the rotating member 808 may be precluded, and the holding member 805, including slot 805*a* and finger holes 805*b*, may be formed in the support member 810 or another support member disposed atop the front side 810*a* of the support member 810. In an embodiment, the other support member is attached to the support member 810.

With reference to FIGS. 9A-9D, portable electronic device holders (also "holders" herein) of embodiments of the invention may include mounting members having various shapes and sizes, and configured to mount (or attach to) portable electronic devices at various locations of the portable electronic devices.

Figure 9A:
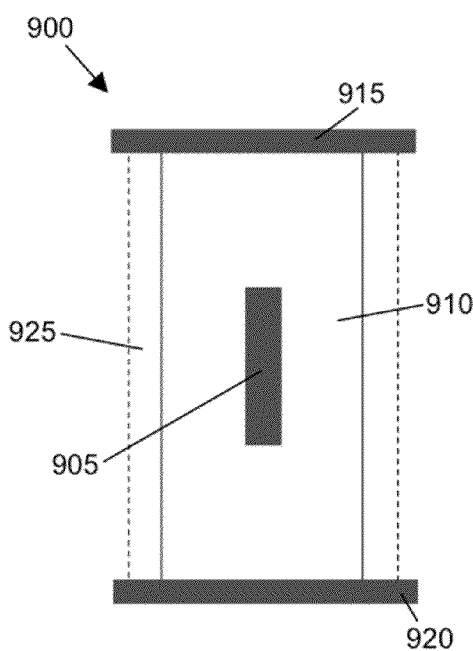
FIG. 9A is a schematic top view of a portable electronic device holder, in accordance with an embodiment of the invention.

FIG. 9A is a schematic front view of a portable electronic device holder (also "holder" herein) 900 including a holding member 905, support member 910, first mounting member 915 and second mounting member 920, in accordance with an embodiment of the invention. The holder 900 is mounted on a portable electronic device 925 (marked by dashed lines). In an embodiment, the portable electronic device 925 is a tablet PC. The mounting members 915 and 920 may run the width of the portable electronic device 925. The support member 910 is rectangular in shape; it is in contact with a portion of a back surface of the portable electronic device 925.

In an embodiment, the length of any of the first mounting member 915 and second mounting member 920 (measured along an axis parallel to a top or bottom side of the portable electronic device 925) divided by the smaller of the length and width of the portable electronic device 925 (and multiplied by 100% to get a percentage) may be less than or equal to about 5%, or less than or equal to about 10%, or less than or equal to about 15%, or less than or equal to about 20%, or less than or equal to about 25%, or less than or equal to about 30%, or less than or equal to about 35%, or less than or equal to about 40%, or less than or equal to about 45%, or less than or equal to about 50%, or less than or equal to about 80%, or less than or equal to about 100%, or less than or equal to about 105%, or less than or equal to about 110%, or less than or equal to about 115%, or less than or equal to about 120%, or less than or equal to about 125%, or less than or equal to about 150%, or less than or equal to about 175%.

Figure 9B:
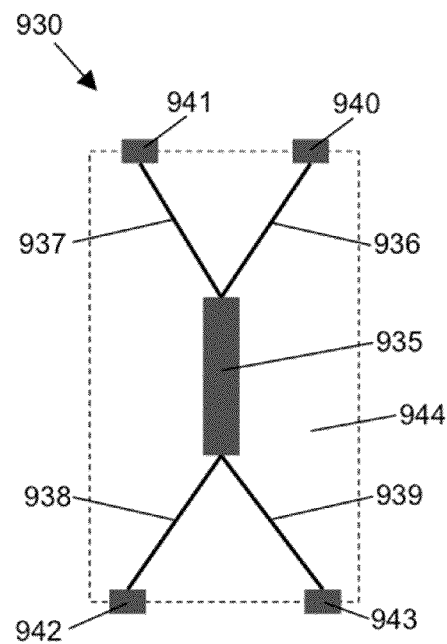
FIG. 9B is a schematic top view of a portable electronic device holder, in accordance with an embodiment of the invention.

FIG. 9B is a schematic front view of a holder 930, in accordance with an embodiment of the invention. The holder 930 includes a holding member 935, first arm 936, second arm 937, third arm 938, fourth arm 939, first mounting member 940, second mounting member 941, third mounting member 942 and fourth mounting member 943. The first arm 936 is attached to the first mounting member 940; the second arm 937 is attached to a second mounting member 941; the third arm 938 is attached to the third mounting member 942; and the fourth arm 939 is attached to the fourth mounting member 943. Each of the arms 936, 937, 938 and 939 is attached to the holding member 935. The holder 930 is mounted on a portable electronic device 944 (marked by dashed lines). In an embodiment, the portable electronic device 944 is a tablet PC. The mounting members 940, 941, 942 and 943 are configured to mount the holder 930 to the portable electronic device 944 at opposing sides (e.g., top side and bottom side) of the portable electronic device 944.

In an embodiment, the length of any of the mounting members 940, 941, 942, and 943 (measured along an axis parallel to a top or bottom side of the portable electronic device 944) divided by the smaller of the length and width of the portable electronic device 944 (and multiplied by 100% to get a percentage) may be less than or equal to about 5%, or less than or equal to about 10%, or less than or equal to about 15%, or less than or equal to about 20%, or less than or equal to about 25%, or less than or equal to about 30%, or less than or equal to about 35%, or less than or equal to about 40%, or less than or equal to about 45%, or less than or equal to about 50%, or less than or equal to about 80%, or less than or equal to about 100%.

Figure 9C:
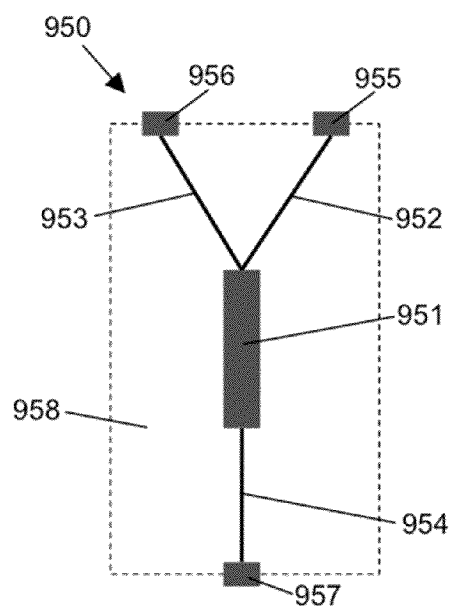
FIG. 9C is a schematic top view of a portable electronic device holder, in accordance with an embodiment of the invention.

FIG. 9C is a schematic front view of a holder 950, in accordance with an embodiment of the invention. The holder 950 includes a holding member 951, first arm 952, second arm 953, third arm 954, first mounting member 955, second mounting member 956 and third mounting member 957. The first arm 952 is attached to the first mounting member 955; the second arm 953 is attached to the second mounting member 956; and the third arm 954 is attached to the third mounting member 957. The first arm 952, second arm 953 and third arm 954 are attached to the holding member 951. The holder 950 is mounted on a portable electronic device 958 (marked by dashed lines). In an embodiment, the portable electronic device 958 is a tablet PC. The first mounting member 955 and second mounting member 956 are configured to mount a side of the portable electronic device 958 that opposes another side of the portable electronic device 958 mounted by the third mounting member 957. In an embodiment, the first mounting member 955 and second mounting member 956 are configured to mount a top (or bottom) side of the portable electronic device 958, and the third mounting member 957 is configured to mount the bottom (or top) side of the portable electronic device 958. In another embodiment, the first mounting member 955 and second mounting member 956 are configured to mount a left (or right) side of the portable electronic device 958, and the third mounting member 957 is configured to mount the right (or left) side of the portable electronic device 958.

In an embodiment, the length of any of the mounting members 955, 956 and 957 (measured along an axis parallel to a top or bottom side of the portable electronic device 958) divided by the smaller of the length and width of the portable electronic device 958 (and multiplied by 100% to get a percentage) may be less than or equal to about 5%, or less than or equal to about 10%, or less than or equal to about 15%, or less than or equal to about 20%, or less than or equal to about 25%, or less than or equal to about 30%, or less than or equal to about 35%, or less than or equal to about 40%, or less than or equal to about 45%, or less than or equal to about 50%, or less than or equal to about 80%, or less than or equal to about 100%. In an embodiment, the length of the third mounting member 957 is larger than a length or width of the portable electronic device 958.

Figure 9D:
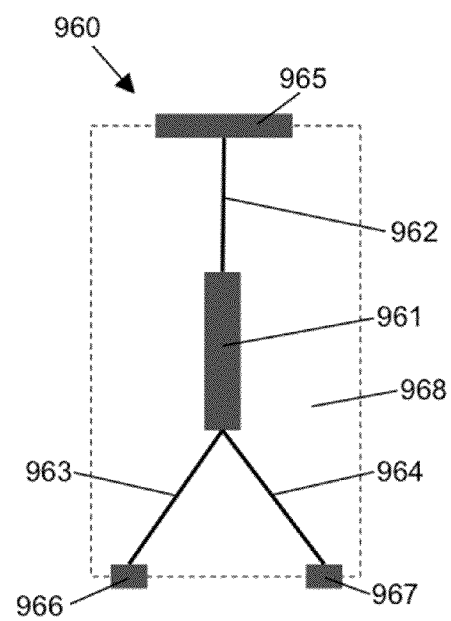
FIG. 9D is a schematic top view of a portable electronic device holder, in accordance with an embodiment of the invention.

FIG. 9D is a schematic front view of a holder 960, in accordance with an embodiment of the invention. The holder 960 includes a holding member 961, first arm 962, second arm 963, third arm 964, first mounting member 965, second mounting member 966 and third mounting member 967. The first arm 962 is attached to the first mounting member 965; the second arm 963 is attached to the second mounting member 966; and the third arm 964 is attached to the third mounting member 967. The first arm 962, second arm 963 and third arm 964 are attached to the holding member 961. The holder 960 is mounted on a portable electronic device 968 (marked by dashed lines). In an embodiment, the portable electronic device 968 is a tablet PC. The first mounting member 965 is configured to mount a side of the portable electronic device 968 that opposes another side of the portable electronic device 968 mounted by the second mounting member 966 and third mounting member 967. In an embodiment, the first mounting member 965 is configured to mount a top (or bottom) side of the portable electronic device 968, and the second mounting member 966 and third mounting member 967 are configured to mount the bottom (or top) side of the portable electronic device 968. In another embodiment, the first mounting member 965 is configured to mount a left (or right) side of the portable electronic device 968, and the second mounting member 966 and third mounting member 967 are configured to mount the right (or left) side of the portable electronic device 968.

With continued reference to FIG. 9D, the first mounting member 965 has a length that is larger than a length of each of the second mounting member 966 and third mounting member 967. In an embodiment, the length of the first mounting member 965 (measured along an axis parallel to a top or bottom side of the portable electronic device 968) divided by the smaller of the length and width of the portable electronic device 968 (and multiplied by 100% to get a percentage) may be less than or equal to about 5%, or less than or equal to about 10%, or less than or equal to about 15%, or less than or equal to about 20%, or less than or equal to about 25%, or less than or equal to about 30%, or less than or equal to about 35%, or less than or equal to about 40%, or less than or equal to about 45%, or less than or equal to about 50%, or less than or equal to about 80%, or less than or equal to about 100%. In an embodiment, the length of the first mounting member 965 is larger than a length or width of the portable electronic device 968.

Portable Electronic Device Holders Removably Attachable to a User's Arm

In yet another aspect of the invention, a portable electronic device holder (also "holder" herein) is provided, comprising a support member having a front side and a back side, the back side configured to be adjacent a portable electronic device (e.g., portable personal computer) when the portable electronic device holder has mounted the portable electronic device. A holding member is disposed atop the front side of the support member, the holding member configured to attach the portable electronic device holder to a user's wrist, arm or forearm. The holder further comprises a first mounting member disposed at a first side or corner of the support member, the first mounting member configured to mount a portable electronic device. A second mounting member is disposed at a second side or corner of the support member, the second mounting member configured to mount a portable electronic device. In an embodiment, the portable electronic device holder is configured for use with a portable personal computer (e.g., tablet PC).

Mounting members may be formed of magnetic materials for mating with side or edge portions of a portable electronic device. For example, a mounting member may be formed of a magnetic material for coupling (or attaching) to a side of a portable electronic device. In such a case, the mounting member may be removably attached to the side of the portable electronic device.

In an embodiment, the holding member is attached to the support member. In another embodiment, the holding member is attached to the support member via a rotating member that is configured to permit the holding member to rotate in relation to the support member. In yet another embodiment, the holding member is attached to the support member via one or more arms.

Figure 10A:
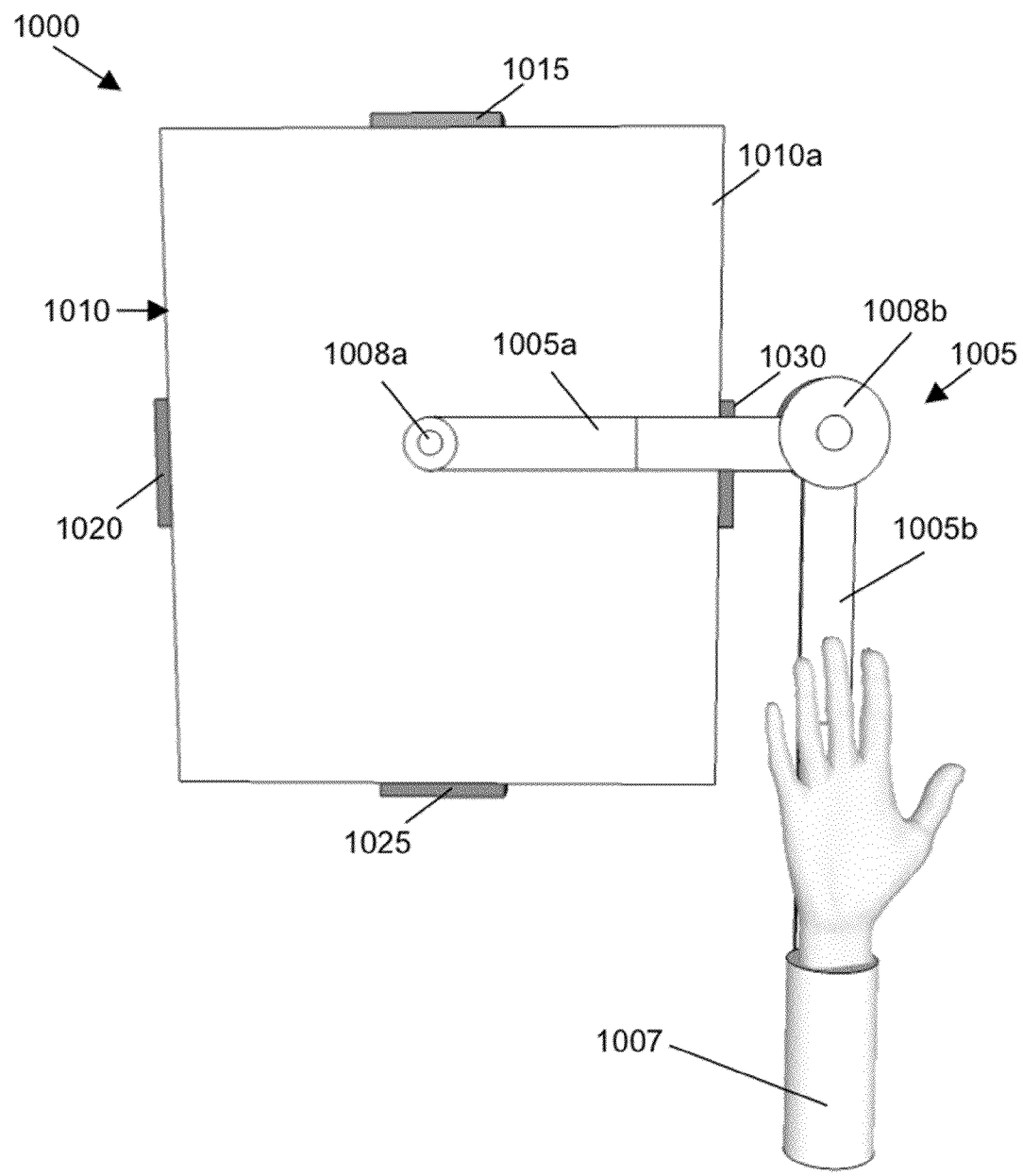
FIG. 10A is a front view of a portable electronic device holder (also "holder" herein), in accordance with an embodiment of the invention.
Figure 10B:
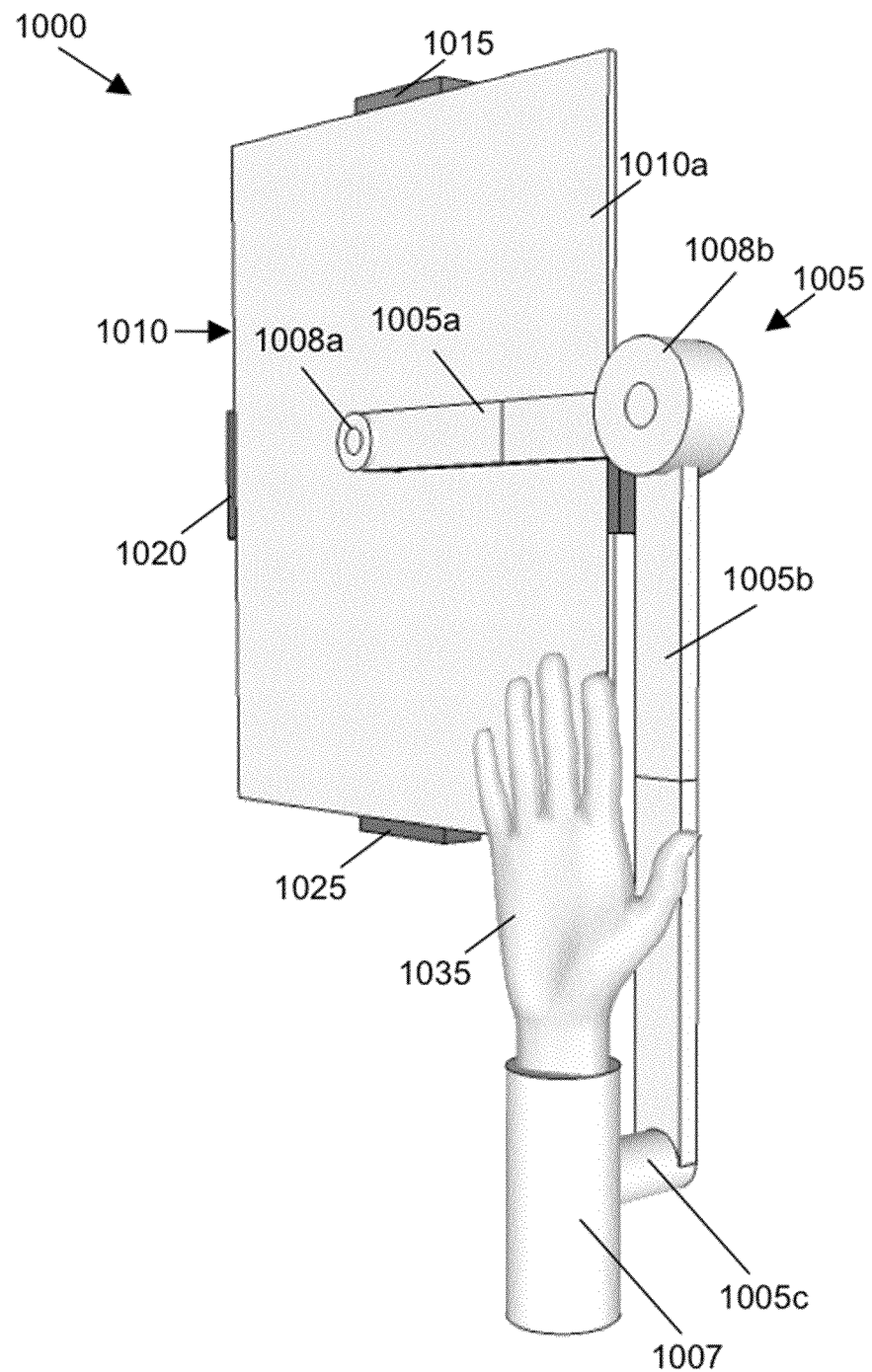
FIG. 10B is a perspective front side view of the holder, in accordance with an embodiment of the invention.
Figure 10C:
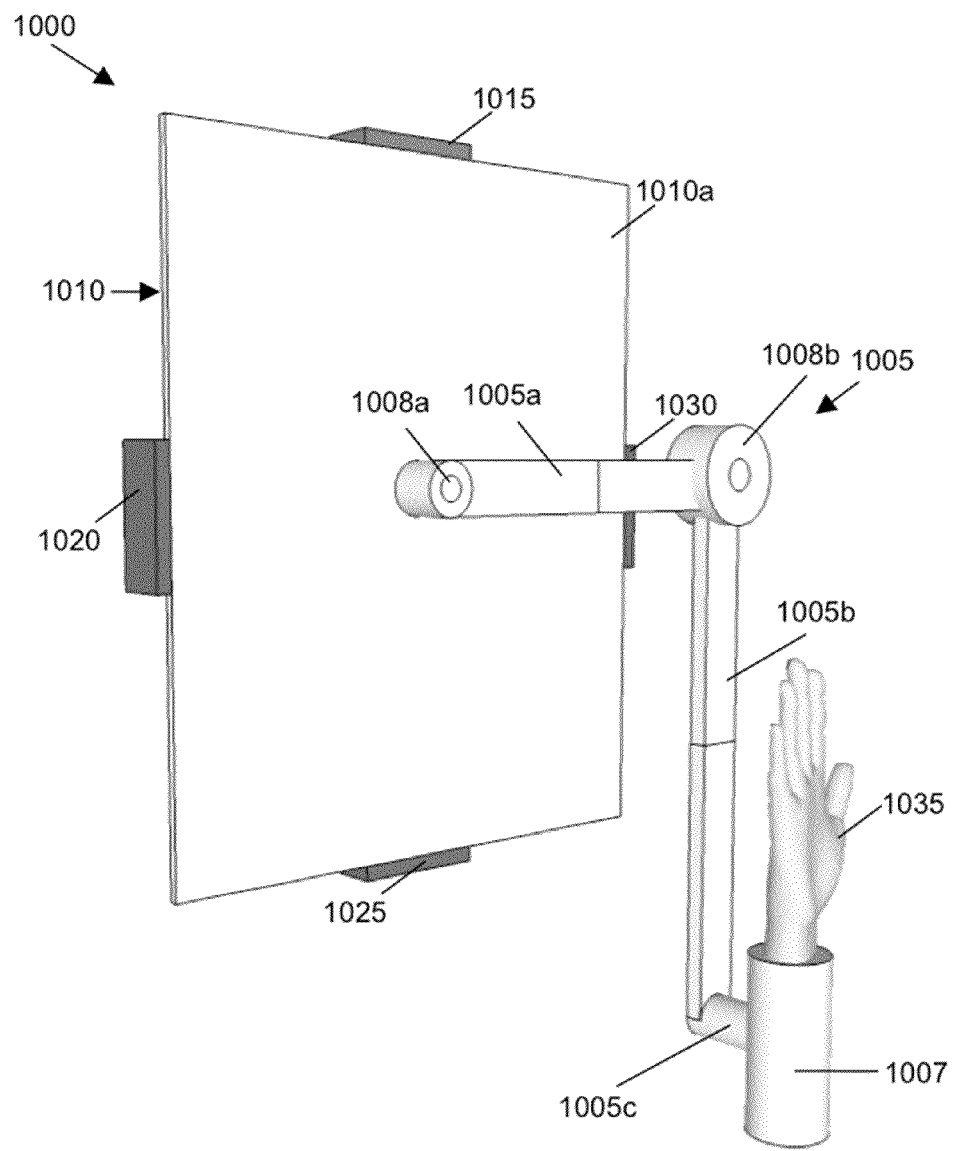
FIG. 10C is a perspective front side view of the holder, in accordance with an embodiment of the invention.
Figure 10D:
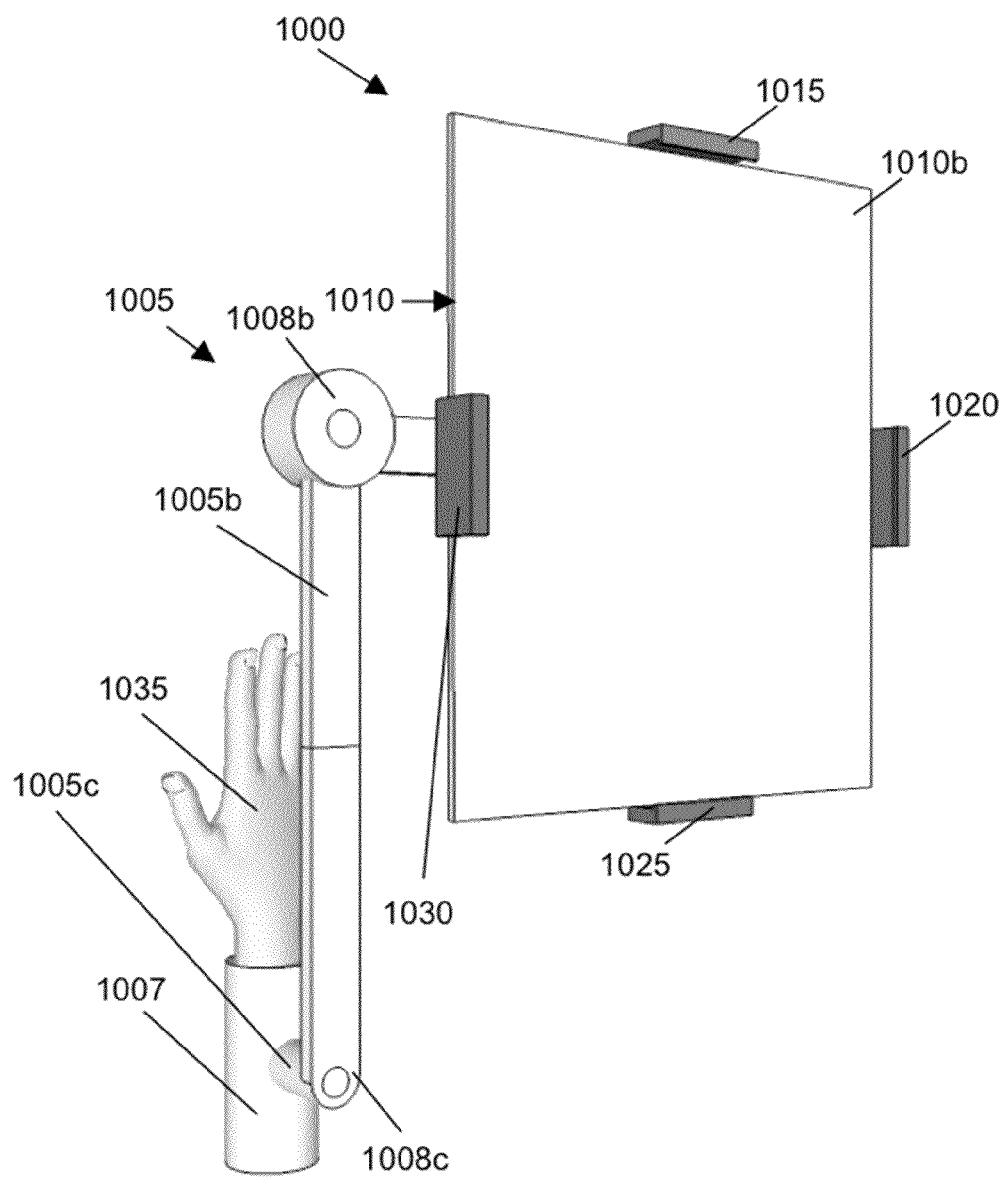
FIG. 10D is a perspective back side view of the holder, in accordance with an embodiment of the invention.
Figure 10E:
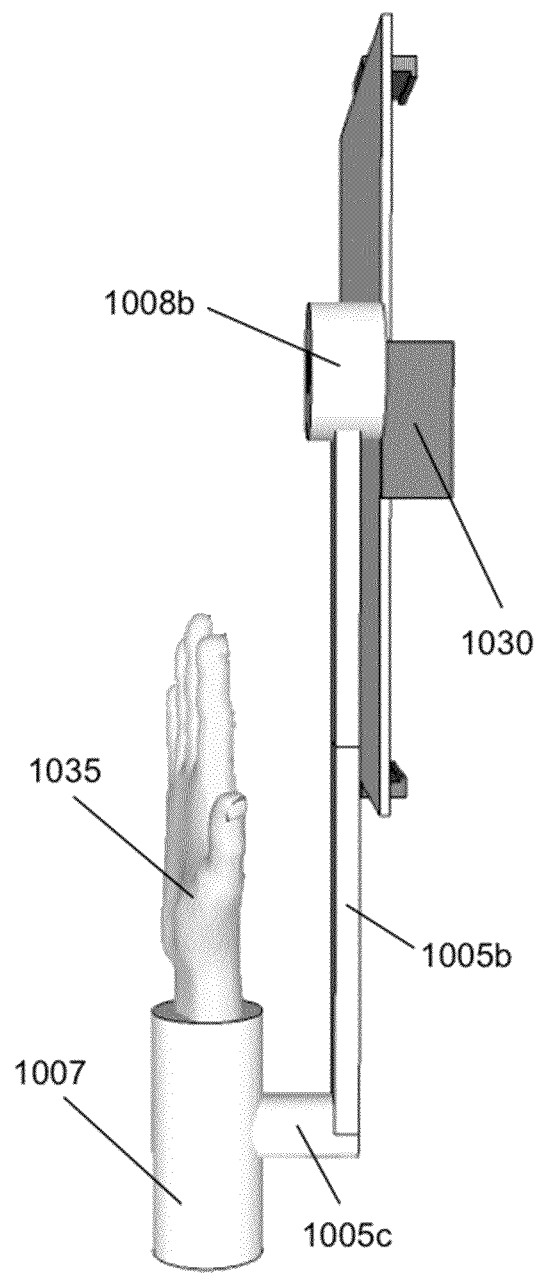
FIG. 10E is a perspective left side view of the holder, in accordance with an embodiment of the invention.

FIG. 10A is a front view of a portable electronic device holder (also "holder" herein) 1000, in accordance with an embodiment of the invention. FIG. 10B is a perspective front side view of the holder 1000, in accordance with an embodiment of the invention. FIG. 10C is a perspective front side view of the holder 1000, in accordance with an embodiment of the invention. FIG. 10D is a perspective back side view of the holder 1000, in accordance with an embodiment of the invention. FIG. 10E is a perspective left side view of the holder 1000, in accordance with an embodiment of the invention.

With reference to FIGS. 10A-10E, the holder 1000 includes an arm 1005 connecting a holding member 1007 to a support member 1010 of the holder 1000. The arm 1005 includes a first arm 1005a, a second arm 1005b and a third arm 1005c. The first arm 1005a is attached to a front side 1010a of the support member 1010. The third arm 1005c is attached to the holding member 1007.

With reference to FIGS. 10A-10E, the arm 1005 further includes a first rotating member 1008a, a second rotating member 1008b, and a third rotating member 1008c (see FIG. 10D). With reference to FIG. 10C, the first rotating member 1008a is attached to the first arm 1005a and the support member 1010; the first rotating member 1008a is configured to permit the first arm 1005a (and the arm 1005) to rotate in relation to the support member 1010. The first rotating member 1008a may include a locking mechanism to hold or lock the first arm 1005a at a particular angle with respect to a fixed position on the front side 1010a of the support member 1010. The second rotating member 1008b is attached to the first arm 1005a and second arm 1005a. The second rotating member 1008b is configured to permit the second arm 1005b to rotate in relation to the first arm 1005a. In an alternative embodiment, the second rotating member 1008b may permit the first arm 1005a to rotate in relation to the second arm 1005b.

In embodiments, the arms 1005a, 1005b, 1005c and rotating members 1008a, 1008b, 1008c are configured to permit a user to angularly orient a portable electronic device that has been mounted by the holder 1000, as desired. In an embodiment, a length of the first arm 1005a is adjustable, as indicated by the line perpendicular to a side of the first arm 1005a and located approximately midway along the first arm 1005a (see FIG. 10C). In another embodiment, a length of the second arm 1005b is adjustable, as indicated by the line perpendicular to a side of the second arm 1005b and located approximately midway along the second arm 1005b (see FIG. 10C).

With reference to FIG. 10D, the third rotating member 1008c is attached to the second arm 1005b and the third arm 1005c. In an embodiment, the third rotating member 1008c is configured to permit the second arm 1005b to rotate in relation to the holding member 1007.

In an embodiment, one or more of the rotating members 1008a, 1008b, 1008c may include a locking mechanism to hold arms in place and not permit rotation unless a user disengages the locking mechanism, such as, e.g., by pressing a button.

With reference to FIGS. 10A-10E, the holding member 1007 has been mounted on a user's right forearm. The user's right hand 1035 protrudes from the holding member 1007. It will be appreciated that the holding member 1007 may be mounted on a user's left forearm.

In an embodiment, the holding member 1007 may be configured to mount a user's wrist (e.g., left wrist or right wrist).

In another embodiment, the holding member 1007 may be configured to mount a user's arm (e.g., left arm or right arm).

In an embodiment, the holding member 1007 may include a padding member (not shown) for providing padding to a user's arm, wrist, or forearm once the holding member 1007 has mounted a user's arm, wrist, or forearm. In an embodiment, the circumference of the holding member 1007 may be adjustable such that the holding member 1007 may securely mount user's having variously-sized arms, wrists, or forearms.

With reference to FIGS. 10A-10E, the holding member 1007 may be configured to mount a user's wrist, forearm, or arm in a variety of manners. In an embodiment, the user may mount the holding member 1007 such that the back of the user's wrist is facing the holder 1000. In another embodiment, the user may mount the holding member 1007 such that the front of the user's wrist is facing the holder 1000.

Various alternatives are possible for the holder 1000 of FIGS. 10A-10E. In an embodiment, the arm 1005 may be precluded and the holding member 1007 may be directly attached to the support member 1010. In another embodiment, the arm 1005 may include the third arm 1005c attached to the holding member 1007 and the second arm 1005b, as illustrated, but the first arm 1005a may be precluded. In such a case, the second arm 1005b may be directly attached to the support member 1010. The second rotating member 1008b may be included (e.g., disposed between the second arm 1005b and the support member 1010) to enable rotation of the second arm 1005b in relation to the support member 1010.

The arm 1005 and support member 1010 may be formed of a metallic (e.g., aluminum) or polymeric material. In an embodiment, the support member 1010 is formed of a non-magnetic material. The holding member 1007 may be formed of a polymeric material.

In an embodiment, the holding member 1007 is formed of a first piece and a second piece laterally joined together at one or more hinge points. In another embodiment, the holding member 1007 is a single piece. In such a case, the holding member 1007 may be formed of a material that is flexible, thereby permitting a user to mount the holding member 1007 to the user's arm, wrist, or forearm.

Holding Members

Portable electronic device holders of embodiments of the invention may have various types of holding members.

In certain embodiments, the holding member may be a cylindrical object configured to be gripped by a user's left hand or right hand. A user may grip the holding member by wrapping the user's fingers around the periphery of the holding member.

In other embodiments, the holding member may include a slot in a backside of a portable electronic device holder, such as the backside of a support member of the portable electronic device holder. A user may engage the holding member by inserting one or more of the user's fingers into the slot.

A holding member may include a strap configured to secure a user's hand to a back surface of a portable electronic device holder having the holding member. In an embodiment, the strap may be attached to one or more arms of the portable electronic device holder. In another embodiment, the strap may be attached to a support member of the portable electronic device holder. The strap may operate by keeping the portable electronic device holder mounted to the user's hand with the aid of friction and pressure generated from the strap pressing against the user's hand. The strap may keep the portable electronic device holder mounted to the user's hand without the user gripping or crimping the strap. This may advantageously permit the user to hold the portable electronic device holder while minimizing any stress imposed on the user's hand. In an embodiment, the strap is configured to press the user's hand against a back surface of the portable electronic device holder. The strap is configured to generate pressure against the user's hand (e.g., back surface or front surface of the user's hand). The pressure may aid in keeping the portable electronic device holder from falling out of the user's hand. In another embodiment, the strap may include a slot configured to accept a user's hand. The slot may include a first portion configured to come in contact with either a back surface or front surface of a user's hand. In an embodiment, the slot may include a second portion configured to come in contact with another surface of a user's hand, such as a surface that opposes the surface that the first portion of the slot comes in contact with. A user may engage the holding member by inserting the user's hand into the slot. The strap is configured to generate pressure to aid in keeping the portable electronic device holder from slipping out of the user's hand.

In various embodiments, the holding member may be removably attachable to a support member of a portable electronic device holder. In other embodiments, the holding member and support member may be formed of separate pieces. In still other embodiments, the holding member may be single piece or unitary with a support member of the portable electronic device holder. In such a case, the holding member may be formed from the same material as the support member of the portable electronic device holder.

In some situations, a portable electronic device holder may include a holding member that may enable a user to attach the portable electronic device holder to a support structure. Such support structure may be mounted to various movable or immovable objects, such as, e.g., a car's dashboard, a refrigerator, a vertical surface, a fireplace mantle, a window, or a car's windshield. In a particular implementation, a first holding member of a portable electronic device holder may be configured to operably mate with a second holding member attached to another object, such as a vertical surface. This may enable a user to removably attach the portable electronic device holder to the second holding member by mating the first holding member with the second holding member. The user may then remove the portable electronic device holder form the other object by decoupling the first holding member from the second holding member. The second holding member may be attached to the other object or formed in the other object.

Holding members provided herein may enable a user to hold and move or rotate a portable electronic device holder with the aid of the user's hand or fingers. For instance, a holding member may enable a user to curl the user's fingers around the holding member. The holding member may include a cylindrical portion extending away from a support surface of the portable electronic device holder. A user may wrap the user's fingers around the cylindrical portion. The holding member may further include a disk-like portion at a distal end of the cylindrical portion, the disk-like portion for coming in contact with back surface of a user's fingers or a side portion of the user's hand.

Figure 11A:
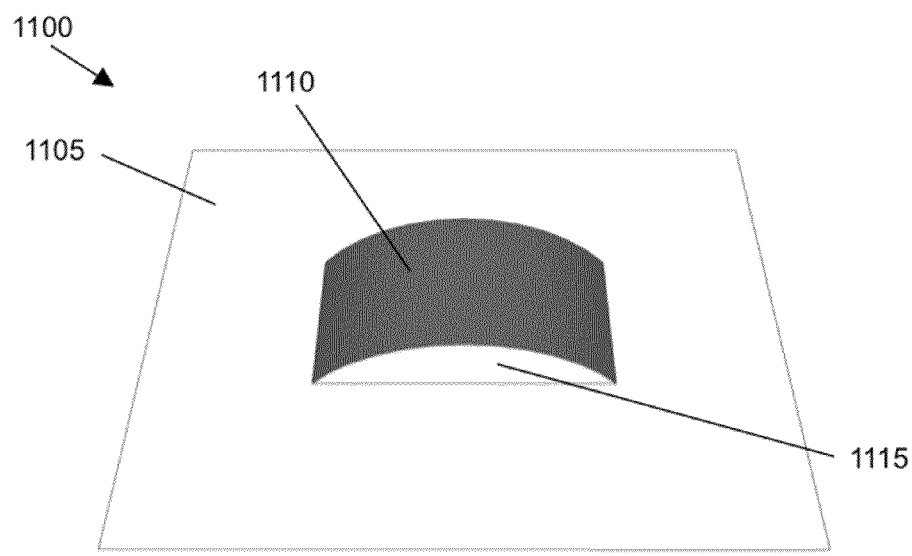
FIG. 11A is a schematic perspective top-side view of a holding member having a strap member, in accordance with an embodiment of the invention.
Figure 11B:
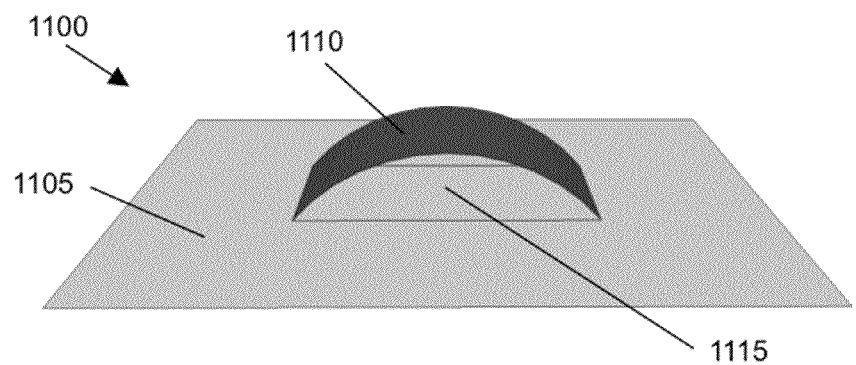
FIG. 11B is a schematic perspective side view of the holding member of FIG. 11A, in accordance with an embodiment of the invention.
Figure 11C:
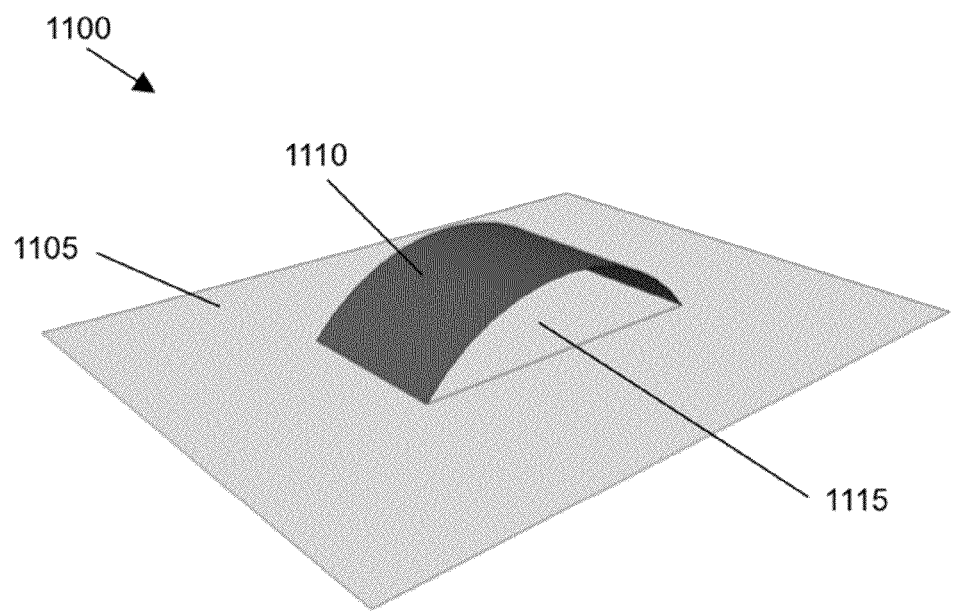
FIG. 11C is a schematic perspective top-side view of the holding member of FIG. 11A, in accordance with an embodiment of the invention.

FIGS. 11A-11C illustrate a holding member 1100, in accordance with an embodiment of the invention. The holding member 1100 may be configured to enable a user to hold any of the portable electronic device holders described herein.

With reference to FIG. 11A, the holding member 1100 comprises a support member 1105 and a strap member 1110. The support member 1105 and the strap member 1110 define a space (or cavity) 1115. The support member 1105 may be any of the support members described herein (e.g., support member 410 of FIG. 4A). In an embodiment, the strap member 1110 is mounted to a support member of the portable electronic device holder (e.g., support member 410 of FIG. 4A).

With continued reference to FIG. 4A, the space 1115 is configured to accept a user's left hand or right hand. In an embodiment, a user may slide one or more of the user's fingers into the space 1115 and hold the portable electronic device holder.

In an embodiment, with the user's left hand or right hand inserted into the space 1115, an inside portion of the strap member 1110 may come in contact with a back surface of a user's hand. A front surface of the user's hand may come in contact with a back surface of the support member 1105. The user's fingers may rest against the back surface of the support member 1105.

In embodiments, the strap member 1110 may have 1 or more, or 2 or more, or 3 or more, or 4 or more, or 5 or more, or 6 or more, or 7 or more, or 8 or more, or 9 or more, or 10 or more points of attachment to the support member 1105. With reference to FIG. 11B, the strap member 1110 may be a single-piece unit having two points of attachment to the support member 1105. The strap member 1110, as illustrated, is arced. In other embodiments, the strap member 1110 may be formed of multiple pieces, such as, e.g., two pieces or three pieces. In addition, the strap member 1110 may have any angular disposition with respect to the support member 1105.

FIG. 11C is a schematic perspective side view of the holding member 1100, in accordance with an embodiment of the invention. The strap member 1110 may be flexible to enable hands of various sizes to be inserted into the space 1115. The strap member 1110 may be formed of one or more of a polymeric material, a fabric and hide (e.g., leather, alligator skin, snake skin). In an embodiment, the strap member 1110 is formed of leather.

The strap member 1110 may be attached to the support member 1105 with the aid of one or more of threading, metallic attachment members (e.g., staples), and glue. In an embodiment, the strap member 1110 may be stapled to the support member 1105.

In an embodiment, the strap member 1110 may be configured to stretch to conform to a user's hand. In an embodiment, the strap member 1110 may be configured to stretch and retract to conform to a user's hand.

In an embodiment, the strap member 1110 may be attached to any of the of the support members described herein. For instance, the holding member of the holder 400 of FIGS. 4A-4E may include a strap member (such as strap member 1110) attached to the support member 410 of the holder 400. A user may hold the holder 400 (and any portable electronic device mounted by the holder 400) by sliding the user's left or right hand into the space 1115 of the strap member.

In an embodiment, the strap member 1110 is configured to permit a user to engage the holding member 1100 in an "open hand" manner, i.e., without crimping or gripping the hand the user inserts into the space 1115. This may advantageously permit a user to hold a portable electronic device holder having the holding member 1100 without expending a considerable amount of energy to hold the holding member. In addition, the "open hand" configuration may have various ergonomic benefits, such as minimizing the strain on the tendons in a user's hand.

Holding members may be formed of various materials. In an embodiment, holding members may be formed of one or more polymeric materials. In another embodiment, holding members may be formed of a foam material. In another embodiment, holding members may be formed of a metallic material, such as an elemental metal (e.g., aluminum) or a metal alloy, such as a nickel and aluminum alloy.

Holding members may have various shapes and configurations. In some cases, a holding member may permit a user to rest the user's hand between a back surface of a portable electronic device holder and the holding member. In such a case, the holding member may be angled with respect to a side of the portable electronic device holder. In such a case, the portable electronic device holder may be square or rectangular, and the sides may be orthogonal to one another. For instance, the holding member may be angled at about 5°, or 6°, or 7°, or 8°, or 9°, or 10°, or 11°, or 12°, or 13°, or 14°, or 15°, or 16°, or 17°, or 18°, or 19°, or 20°, or 21°, or 22°, or 23°, or 24°, or 25°, or 26°, or 27°, or 28°, or 29°, or 30°, or 31°, or 32°, or 33°, or 34°, or 35°, or 36°, or 37°, or 38°, or 39°, or 40°, or 41°, or 42°, or 43°, or 44°, or 45° with respect to a side of the portable electronic device holder.

Figure 12A:
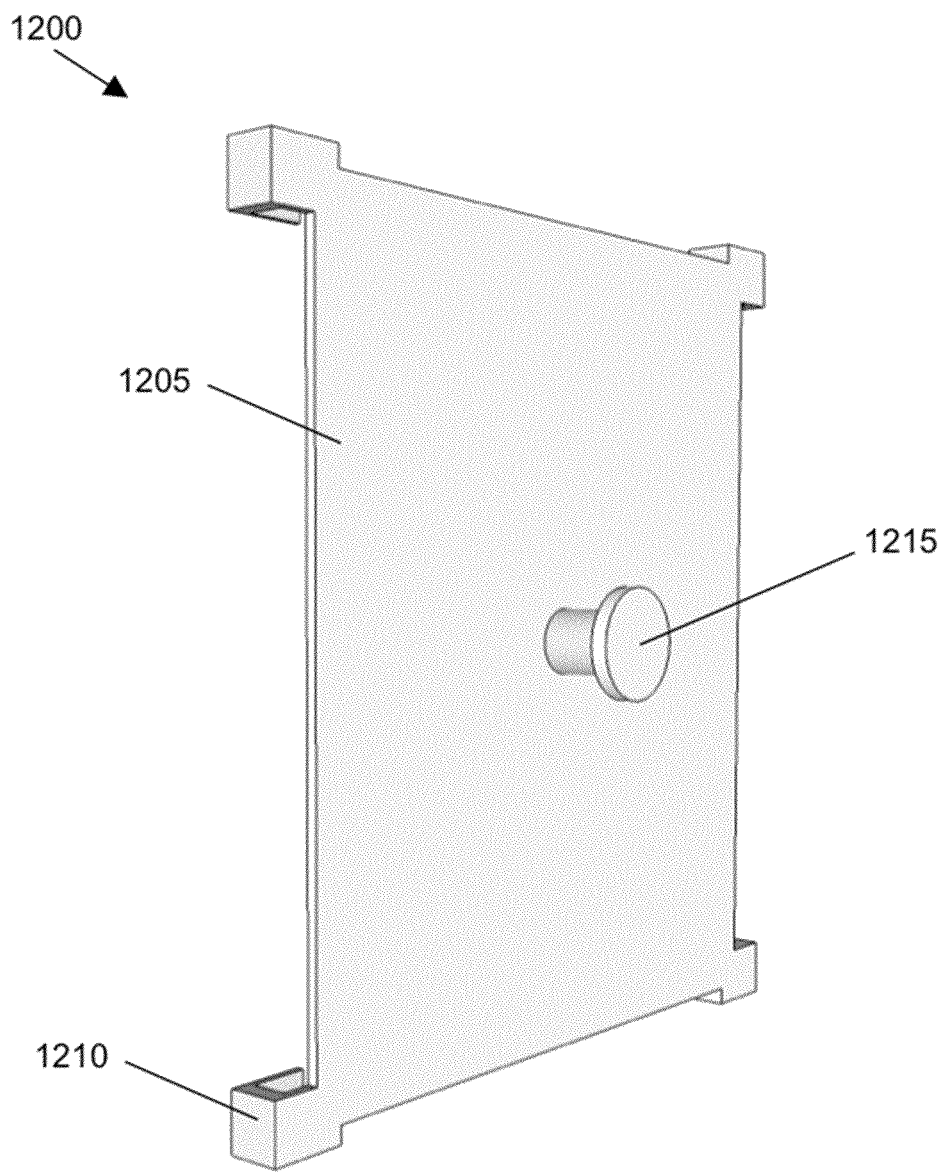
FIG. 12A is a schematic perspective side view of a holder, in accordance with an embodiment of the invention.

FIG. 12A shows a perspective view of a portable electronic device holder 1200, in accordance with an embodiment of the invention. The holder 1200 includes a support member 1205 for resting against a portable electronic device (e.g., iPad), and a plurality of mounting members 1210 for securing the portable electronic device. The holder 1200 includes a holding member 1215 for enabling a user to hold or grip the holder 1200.

Figure 12B:
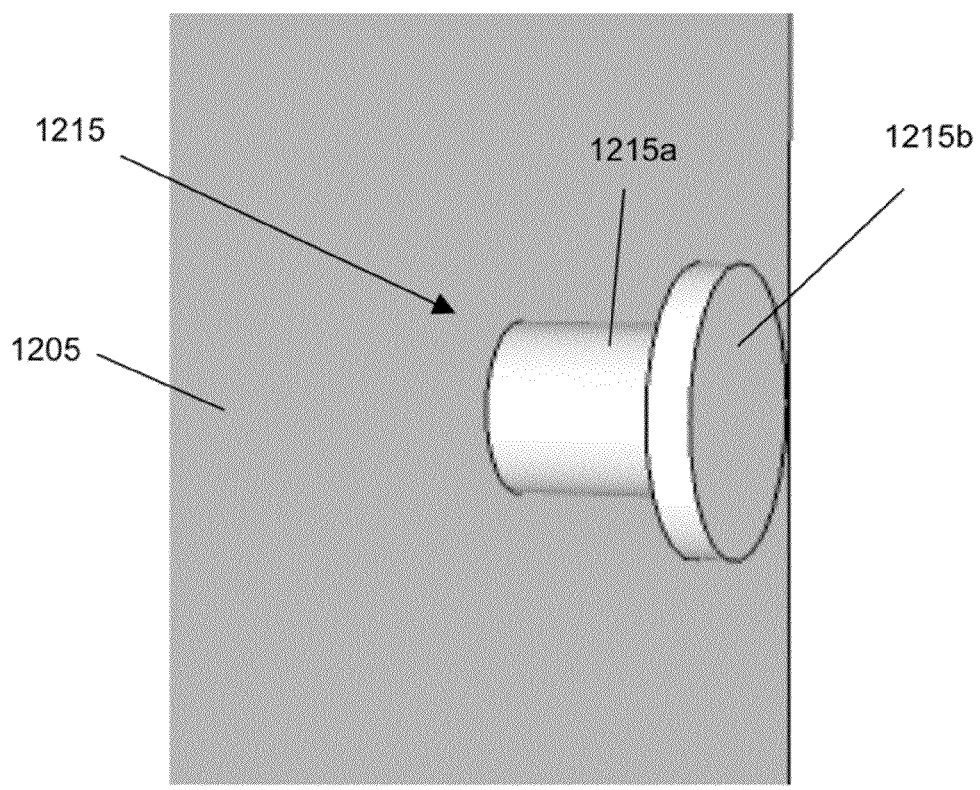
FIG. 12B is a schematic perspective view of a holding member of the holder of FIG. 12A, in accordance with an embodiment of the invention.

FIG. 12B shows an enlarged view of the holding member 1215. The holding member 1215 includes an arm 1205*a* projecting away from a surface of the support member 1205. The arm 1215*a* is attached to the surface of the support member 1205. The holding member 1215 further includes a collar 1215*b*. The arm 1215*a* and collar 1215*b* may be disc-shaped structures. In other cases, the collar 1215*b* may have other shapes, such as box-like, triangular, or hexagonal. In some embodiments, the collar 1215*b* has a larger diameter than the arm 1215*a*.

In some embodiments, the arm 1215*a* and the collar 1215*b* are single-piece (or unitary). In other embodiments, the arm 1215*a* and the collar 1215*b* are separate pieces attached to one another. The arm 1215*a* is attached to the support member 1205 of the holder 1200. In some cases, the arm 1215*a* may be single-piece with the support member 1205.

Figure 12C:
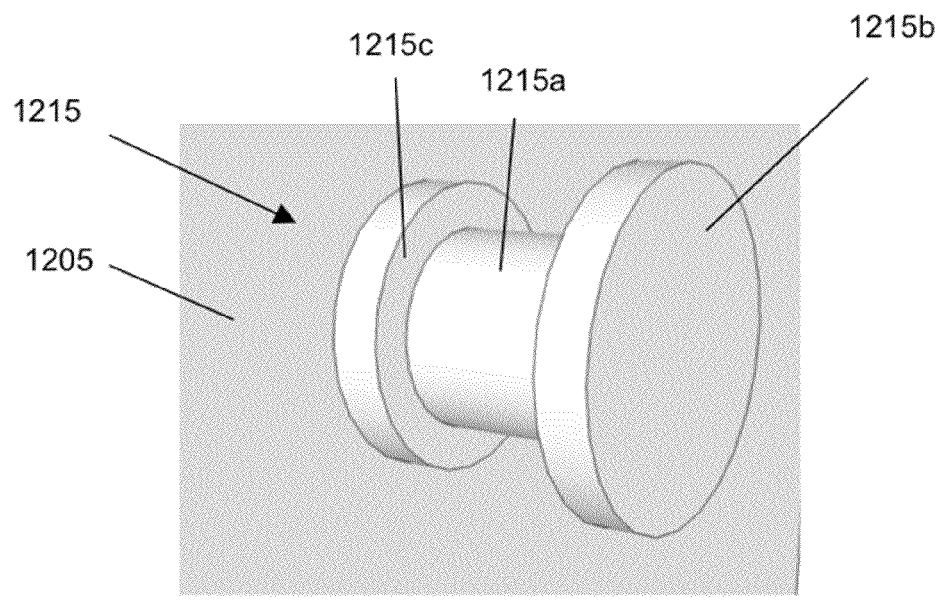
FIGS. 12C and 12D are schematic perspective views of alternatives to the holding member of FIGS. 12A and 12B, in accordance with embodiments of the invention.
Figure 12D:
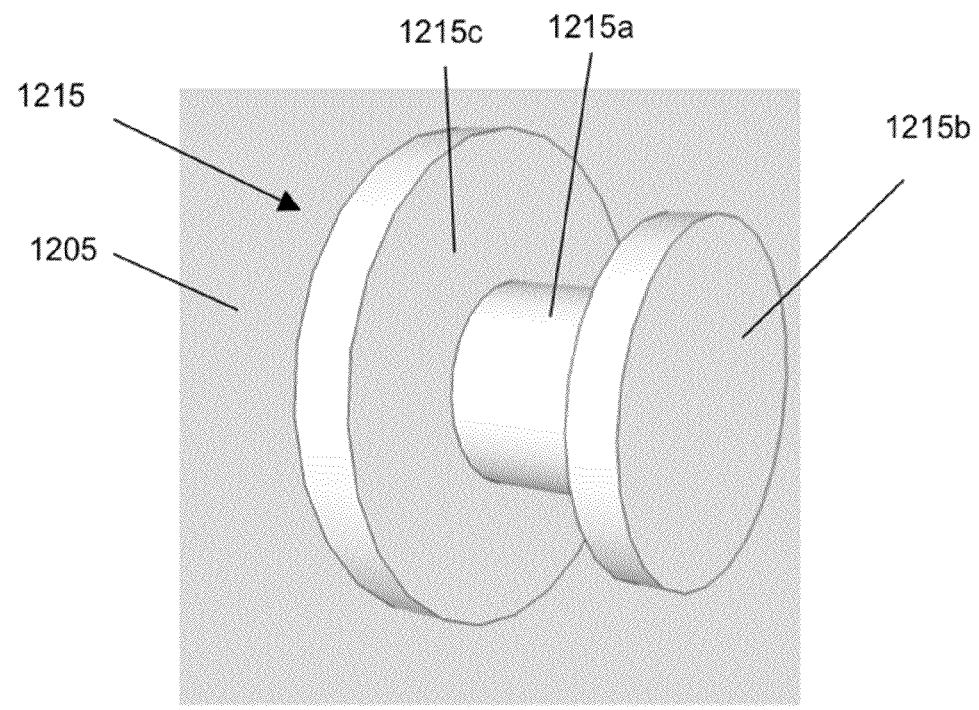
Figure 12E:
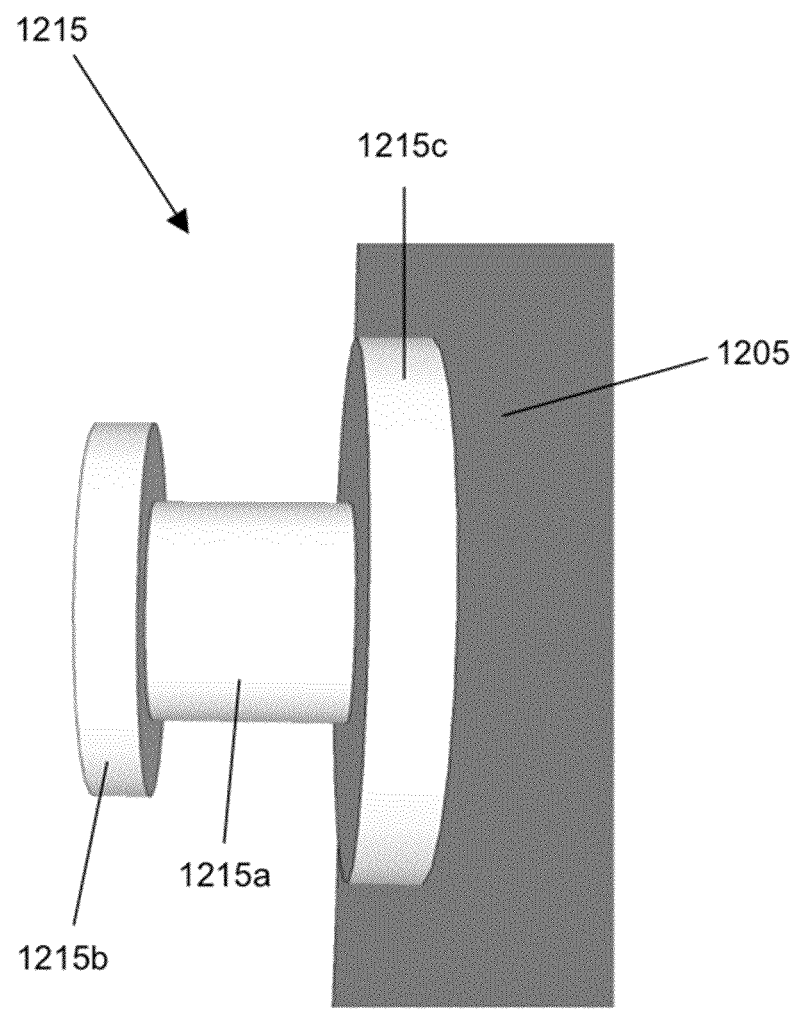
FIG. 12E is a schematic perspective side view of the holding member of FIG. 12D, in accordance with an embodiment of the invention.

In some implementations, the holding member 1215 may have a second collar. With reference to FIG. 12C, the holding member 1215 includes the arm 1215*a*, a first collar 1215*b* and a second collar 1215*c*. The first collar 1215*b* has a larger diameter than the second collar 1215*c*. The first collar 1215*b* and second collar 1215*c* have larger diameters than the arm 1215*a*. Alternatively, with reference to FIG. 12D, the first collar 1215*b* may have a smaller diameter than the second collar 1215*c*. FIG. 12E is a side view of the holding member 1215 of FIG. 12D.

In some embodiments, the arm 1215*a*, the first collar 1215*b* and the second collar 1215*c* are single-piece (or unitary). In other embodiments, the arm 1215*a*, the first collar 1215*b* and the second collar 1215*c* are separate pieces attached to one another. The second collar 1215*c* is attached to the support member 1205 of the holder 1200. In some cases, the second collar 1215*c* may be single-piece with the support member 1205.

The holding member 1205 may permit a user to hold the holder 1200 with the aid of the user's fingers. The user may slide the user's fingers around the arm 1215*a* and rest the user's hands against the collar 1215*b*. If the holder includes collars 1215*b* and 1215*c*, the user may rest the user's hand against both collars. This may provide sufficient contact pressure to hold the holder securely against the user's hand, thereby enabling the user to hold a portable electronic device (e.g., iPad) with one hand and use the portable electronic device with the user's other hand.

Mounting Members

Portable electronic device holders of embodiments of the invention may have various types of mounting members.

In embodiments, mounting members may be configured to mount a top surface of a portable electronic device. In an embodiment, mounting members may include hooks, clips, slots or straps that are configured to come in contact with a front surface or edge portions of a portable electronic device.

In an embodiment, a portable electronic device holder includes a support member (see above) with a plurality of mounting members that include straps configured to wrap around a front surface of the portable electronic device. In an embodiment, the straps may be flexible; they may be configured to extend and contract in length to mount (and dismount) portable electronic devices. In another embodiment, the straps may have lengths adjustable by a user.

EXAMPLE 1

A PEDH similar to PEDH 100 of FIGS. 1A-1I is provided for use with a tablet PC (e.g., Apple iPad). The PEDH has mounting members that are heat treatable to conform to the thickness of the tablet PC. The mounting members have metallic attachment members for attachment to the arms of the PEDH. A user gently cleans the top and bottom edges of the back side and front side of the tablet PC with a solution of soap and water. The user then heats the mounting members in a bath of hot water, thereby softening the mounting members. Once softened, the user molds the mounting members around the top and bottom edges of the tablet PC. The user molds the mounting members until their widths substantially conform to the thickness of the tablet PC. The user then permits the mounting members to cool and harden in air for about one hour. Optionally, the user may cool the mounting members by putting them in a cool or cold environment, such as a freezer. Once cooled and hardened, the mounting members have widths that conform to the thickness of the portable electronic device. The user attaches the mounting members to the top and bottom edges of the tablet PC. The user then attaches the arms of the PEDH to the mounting members. The user grips the holding member of the PEDH and begins using the tablet PC.

EXAMPLE 2

A portable electronic device holder is provided having a support member, a holding member attached to the support member, and a plurality of mounting members. The mounting members include straps for wrapping around a front surface of a portable electronic device (e.g., tablet PC). In particular, a first strap wraps around a left side of the front surface of the portable electronic device, and a second strap wraps around a right side of the front surface of the portable electronic device. The holding member includes a slot for accepting a user's left or right hand. The slot is defined by an outer portion of the holding member, the outer portion configured to come in contact with a back or front surface of the user's left or right hand. Pressure generated by the strap keeps the portable electronic device from sliding out of the user's left or right hand.

Various alternatives and modifications may be contemplated by those of skill in the art. For example, while a closable flap has been described in the context of FIGS. 4A-4E, it will be appreciated that other portable electronic device holders described herein may include closable flaps. In addition, while a strap member has been described in the context of FIGS. 11A-11C, it will be appreciated that other portable electronic device holders described herein may include strap members.

Portable electronic device holders provided herein may be combined with or modified by other electronic device holders, including the components of any such holders. For example, portable electronic device holders provided herein may be combined with or modified by electronic device holders described in U.S. Provisional Patent Application No. 61/320,704 to Alemozafar, U.S. Provisional Patent Application No. 61/382,490 to Alemozafar et al., U.S. Patent Publication No. 2011/0031287 to Le Gette et al., U.S. Patent Publication No. 2010/0072334 to Le Gette et al., U.S. Patent Publication No. 2009/0272779 to Vu, U.S. Patent Publication No. 2006/0175365 to Sandler, U.S. Pat. No. 5,074,222 to Welch, U.S. Pat. No. 5,573,158 to Penn, U.S. Pat. No. 5,421,499 Bauer, U.S. Pat. No. 5,222,641 to Medeiros et al., U.S. Pat. No. 4,799,610 to Hsieh, U.S. Pat. No. 4,450,993 to Ephraim, U.S. Pat. No. 3,106,037 to Harkey, U.S. Pat. No. 3,009,613 to Noland, U.S. Pat. No. 2,685,757 to Mirigian, U.S. Pat. No. 2,603,134 to Burnam, and U.S. Design Pat. No. 388,246 to Patterson, which are entirely incorporated herein by reference.

It should be understood from the foregoing that, while particular implementations have been illustrated and described, various modifications may be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. A portable electronic device holder, comprising:
    a support member having a front side and a back side, wherein the back side is configured to rest adjacent to a back surface of said portable electronic device;
    a flexible holding member disposed atop the front side of the support member, wherein the holding member is configured to permit a user to hold and move the portable electronic device holder, wherein the flexible holding member comprises a flexible arm coupled to a substantially flat collar, wherein the arm is unitary with the collar; and
    one or more mounting members attached to the support member, each of the one or more mounting members for mounting a front surface of said portable electronic device.

2. The portable electronic device holder of claim 1, wherein the flexible holding member and the support member define a space configured to accept one or more fingers of a user.

3. The portable electronic device holder of claim 1, wherein the arm is disposed between the support member and the collar, and wherein the arm has a smaller diameter than the collar.

4. The portable electronic device holder of claim 1, wherein said one or more mounting members are unitary with said support member.

5. A holder for mounting a portable personal computer, comprising:
a support member having a front side and a back side, the back side for resting adjacent to a back surface of the portable personal computer when the holder has mounted the portable personal computer;
a flexible holding member disposed atop the front side of the support member, and wherein the holding member is configured to permit the user to hold and move the holder, wherein the flexible holding member comprises a flexible arm coupled to a substantially flat collar, wherein the arm is unitary with the support member;
a first mounting member disposed at a first side or corner of the support member, the first mounting member for mounting a front surface of the portable personal computer; and
a second mounting member disposed at a second side or corner of the support member, the second mounting member for mounting the front surface of the portable personal computer.

6. The holder of claim 5, wherein the flexible holding member permits the user to controllably move the holder.

7. The holder of claim 5, wherein the flexible holding member permits the user to grasp the holding member to enable the user to hold and move the holder.

8. The holder of claim 5, further comprising a third mounting member disposed at a third side or corner of the support member.

9. The holder of claim 8, further comprising a fourth mounting member disposed at a fourth side or corner of the support member.

10. The holder of claim 5, wherein the flexible holding member defines a space for accepting one or more fingers of the user.

11. The holder of claim 5, wherein said collar is configured to come in contact with a backside of a hand of the user upon the user engaging with the flexible holding member.

12. The holder of claim 11, wherein said flexible holding member further comprises a second collar disposed adjacent to said support member, wherein said arm is disposed between said collar and said second collar.

13. The holder of claim 5, wherein said first and second mounting members are unitary with said support member.

14. A portable electronic device holder, comprising:
a support member having a front side and a back side, the back side for resting adjacent to a back surface of a portable electronic device, the support member having one or more mounting members for mounting a side or edge portion of a front surface of the portable electronic device; and
a flexible holding member attached to the front side of the support member through a flexible arm, wherein the holding member enables a user to move the portable electronic device holder, wherein said arm is coupled to a substantially flat collar, and wherein the arm is unitary with the support member.

15. The portable electronic device holder of claim 14, wherein the flexible holding member is for enabling a user to hold the portable electronic device holder while using the portable electronic device.

16. The portable electronic device holder of claim 14, wherein the one or more mounting members are unitary with the support member.

17. The holder of claim 12, wherein said arm has a smaller diameter than said first collar and/or second collar.

18. The holder of claim 12, wherein said arm and second collar are unitary with said support member.

* * * * *